United States Patent [19]

Hooker et al.

[11] 4,443,209

[45] Apr. 17, 1984

[54] GAMING APPARATUS HAVING MANUALLY CONTROLLABLE-OPERATING SPEED

[75] Inventors: Donald E. Hooker, Wilmette; Roman A. Tojza, Chicago, both of Ill.

[73] Assignee: Bally Manufacturing Corporation, Chicago, Ill.

[21] Appl. No.: 305,399

[22] Filed: Sep. 25, 1981

Related U.S. Application Data

[62] Division of Ser. No. 119,217, Feb. 7, 1980.

[51] Int. Cl.$^3$ .................... F16H 55/42; F16H 57/00; F16H 57/10; G05G 1/00

[52] U.S. Cl. .................... 474/94; 474/902; 74/411; 74/470; 74/411.5; 464/57

[58] Field of Search .................... 474/94, 902, 903; 74/411, 470, 411.5; 464/57; 267/155

[56] References Cited

U.S. PATENT DOCUMENTS

| | | | |
|---|---|---|---|
| 2,115,849 | 5/1938 | Gustavson | 74/470 |
| 2,256,496 | 9/1940 | Robinson | 464/57 |
| 2,336,307 | 12/1943 | Slye | 74/411 |
| 2,656,178 | 10/1953 | Hughes, Jr. | 74/470 |
| 2,673,468 | 3/1954 | Immel et al. | 74/470 |
| 3,543,064 | 11/1970 | Holper | 74/411 |
| 3,646,832 | 3/1972 | Hirafuji | 74/470 |
| 3,916,713 | 11/1975 | Young | 74/411 |
| 4,273,995 | 6/1981 | Devanney | 74/411 |

*Primary Examiner*—Lawrence J. Staab
*Assistant Examiner*—Michael D. Bednarek
*Attorney, Agent, or Firm*—Welsh & Katz

[57] ABSTRACT

An improved amusement or game device of the type which has one or more indicia-bearing rotatable reels which are rotated upon initiation of play by a player is disclosed. The game device has an improved main drive mechanism which permits the player to vary the initial rotational speed of the reels in direct proportion to the speed in which an associated operating handle is pulled. A supplemental drive mechanism is included for increasing the speed of the reels if the player fails to pull the operating handle with sufficient force to rotate the reels at a predetermined minimum speed. The device also includes an improved indexing means for stopping the reels in accordance with the operation of the game device. The game device also includes means for absorbing excessing energy that may be provided by a player pulling the operating handle with extraordinary speed or force. A mechanism is also included for providing slight resistance to movement of the reels subsequently of enablement of the game device and immediately before pulling of the operating handle, during which time the reels are otherwise free to rotate since neither the main drive mechanism, the supplemental drive mechanism nor the indexing mechanism is engaged at this time.

10 Claims, 27 Drawing Figures

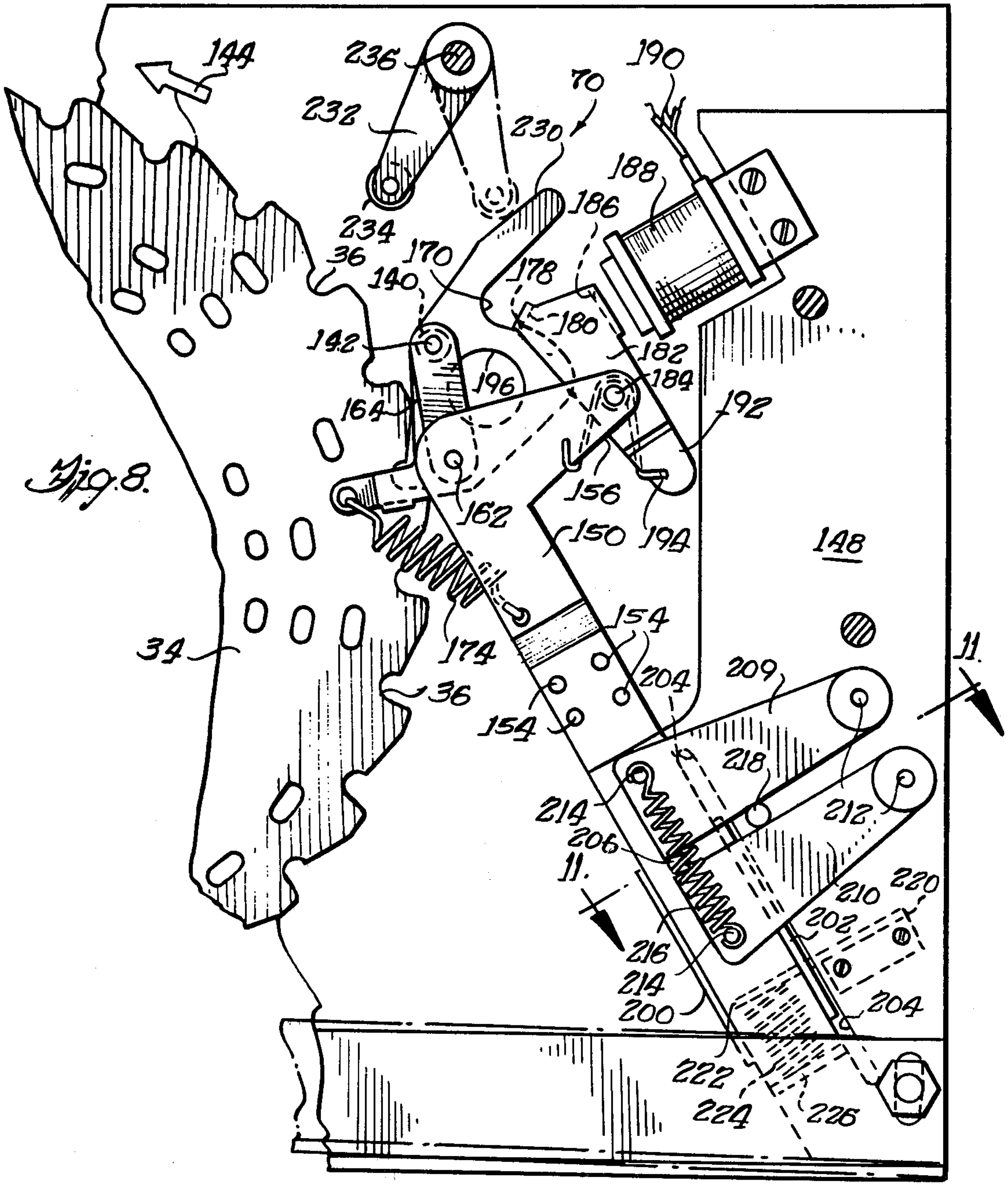
Fig. 8.
Fig. 11.
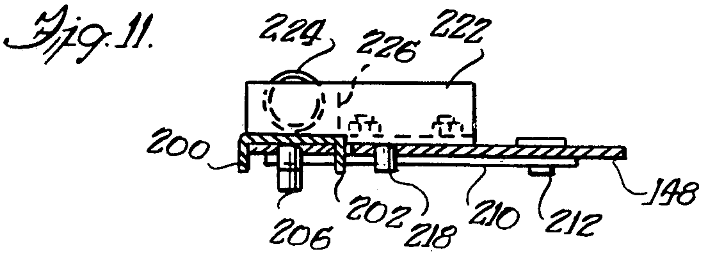

GAMING APPARATUS HAVING MANUALLY CONTROLLABLE-OPERATING SPEED

This is a division, of application Ser. No. 119,217, filed Feb. 7, 1980.

The present invention generally relates to amusement or game devices, and more particularly to game devices of the type which have one or more indicia-bearing rotatable reels which are rotated in response to the pulling of an operating handle and which are subsequently stopped at the completion of a play.

Amusement or game devices of the type which have at least one indicia-bearing rotatable reel, and preferably at least three of such reels have been in existence for decades and have been the subject of considerable research and development in recent years due to the increased popularity of such devices coupled with changes in basic technology, and particularly the incorporation of electronic technology in such devices. This type of game device was originally a mechanical device and then evolved into an electromechanical device in its operation. However, whether it was only mechanical or electromechanical there has been a common characteristic in the nature of the operation of these devices and that has been that the player pulling a handle which initiates the spinning of the reels has resulted in the reels being subjected to a rotation initiating force that has been generally constant, which meant that the initial speed of rotation or angular velocity that is imparted to the reels has been constant regardless of the speed of pulling or force applied to the operating handle. With the incorporation of electrical components into the devices, such as using an electric or stepping motor for initiating rotation which was also activated by pulling the operating handle, the initial speed imparted to the reels also remained constant and independent of the force applied to the operating handle by a player.

While players often believe that there is a technique in being able to successfully play the game device, they may be unaware that the speed in which the handle is pulled is actually quite independent of the speed that is imparted to the reels, since the various mechanical mechanisms that have been designed merely result in energy being stored in a spring which is released when the handle is pulled through its entire stroke. It is believed that game devices which contribute to the feeling that the player is at least partially controlling the operation of the device is a very appealing feature for such game devices and has much to do with the popularity of a game device of this type.

Accordingly, it is an object of the present invention to provide an amusement or game device of the foregoing type which emphasizes the feeling of control or individual manipulation in accordance with a player's feeling of playing proficiency and which actually does give control of the speed of initial reel rotation, within limits, to the player.

It is another object of the present invention to provide an amusement or game device of the foregoing type wherein the actual speed of initial rotation of the reels is directly proportional, again within limits, to the speed or force applied to the operating handle by the player during operation.

A more detailed object of the present invention is to provide a main drive mechanism that is operatively connected to the operating handle which drives the shaft carrying the rotatable reels and which is only engaged therewith during the positive stroke of the handle and which imparts an initial speed of rotation to the shaft and reels that is proportional to the speed with which the handle is pulled through its stroke.

Yet another object of the present invention is to provide a supplemental drive mechanism which is adapted to increase the rotational speed of the shaft in the event it is actuated, with the actuation preferably being provided by a speed detector which provides an actuating signal in the event the rotational speed that is imparted by the main drive mechansim is below a predetermined minimum speed.

Still another object of the present invention is to provide an improved indexing mechanism for stopping each of the reels upon completion of a play of the game device, wherein the stopping mechanism is particularly suited to stopping reels rotating at high speed.

Still another object of the present invention is to provide a mechanism for absorbing excessive energy that would otherwise be transmitted to the main drive mechanism, which is caused by a player pulling the handle with excessive speed or force which, unless absorbed, may have a damaging effect on the structure of the main drive mechanism, reels and indexing mechanism of the gaming device.

Another object of the present invention is to provide a mechanism for preventing creeping or incremental rotation of the reels after the game device has been enabled and before the operating handle is pulled through its stroke, inasmuch as the reels are free to rotate at least in one direction during this time because neither the main drive mechanism, the supplemental drive mechanism nor the indexing mechanism is operatively engaged with the reels or shaft at this time.

Other objects and advantages of the present invention will become apparent upon reading the following detailed description, while referring to the attached drawings, in which:

FIG. 8 is a side elevation with portions shown in cross section of a representative means for stopping one of the rotatable reels and particularly illustrates the same in its latched or disengaged position;

FIG. 11 is a cross sectional view of a portion of the stopping means of FIG. 8 and is taken generally along the line 11—11 thereof;

FIG. 24 is another exploded perspective view of the apparatus shown in FIG. 19, with portions removed;

Broadly stated, the present invention is directed to an improved amusement or game device which is of the type which has a number, preferably at least three rotatable reels, each of which has symbols or other indicia on the outer periphery thereof that are viewed by a player and which provide an indication of a winning combination such as when a combination of identical symbols appear in a viewing window upon completion of a play, i.e., after the game device has been started and the reels have been stopped after a period of spinning or rotation. The game device of the present invention includes several unique mechanisms that result from a basic principal of operation that sets the game device of the present invention apart from conventional prior art game devices, namely, that the speed of rotation of the reels upon initiation of play is determined by the player and is in fact a function of the speed with which the player pulls the operating handle, provided the speed is within predetermined limits as will be more fully explained hereinafter.

Figure 1:
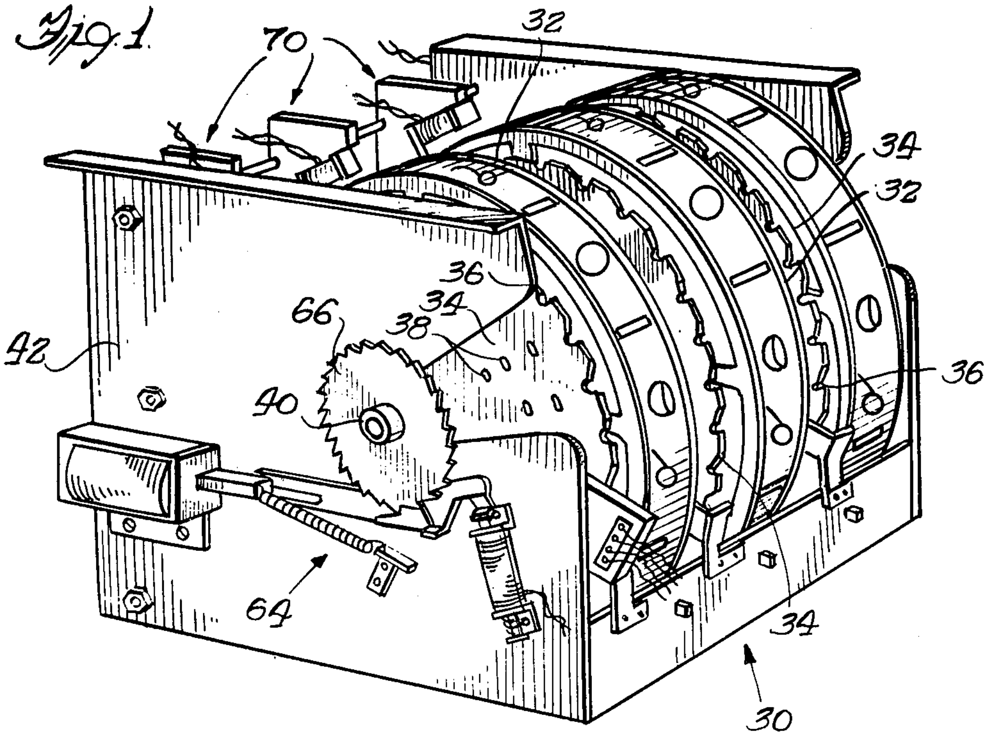
FIG. 1 is a perspective view of the front and left sides of a substructure of an amusement or game device which embodies the present invention and particularly illustrates the supplemental drive mechanism of the present invention.
Figure 2:
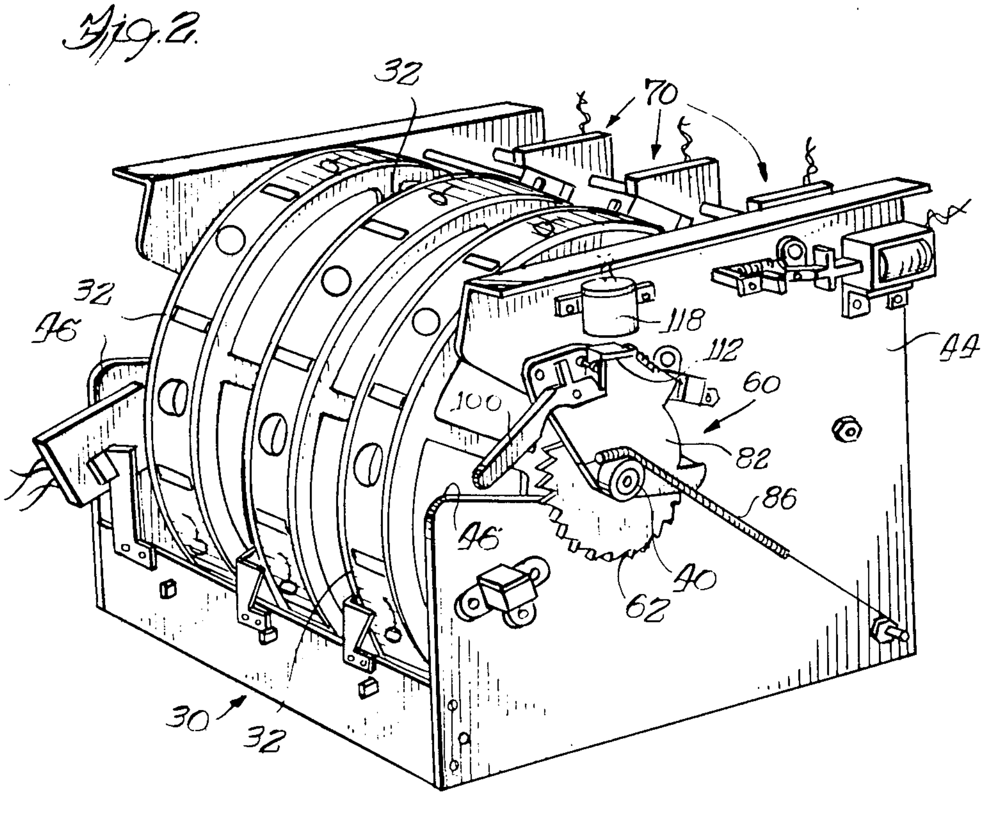
FIG. 2 is a perspective view of the front and right sides of an amusement or game device that embodies the present invention, and particularly illustrates the main drive mechanism of the present invention.
Figure 20:
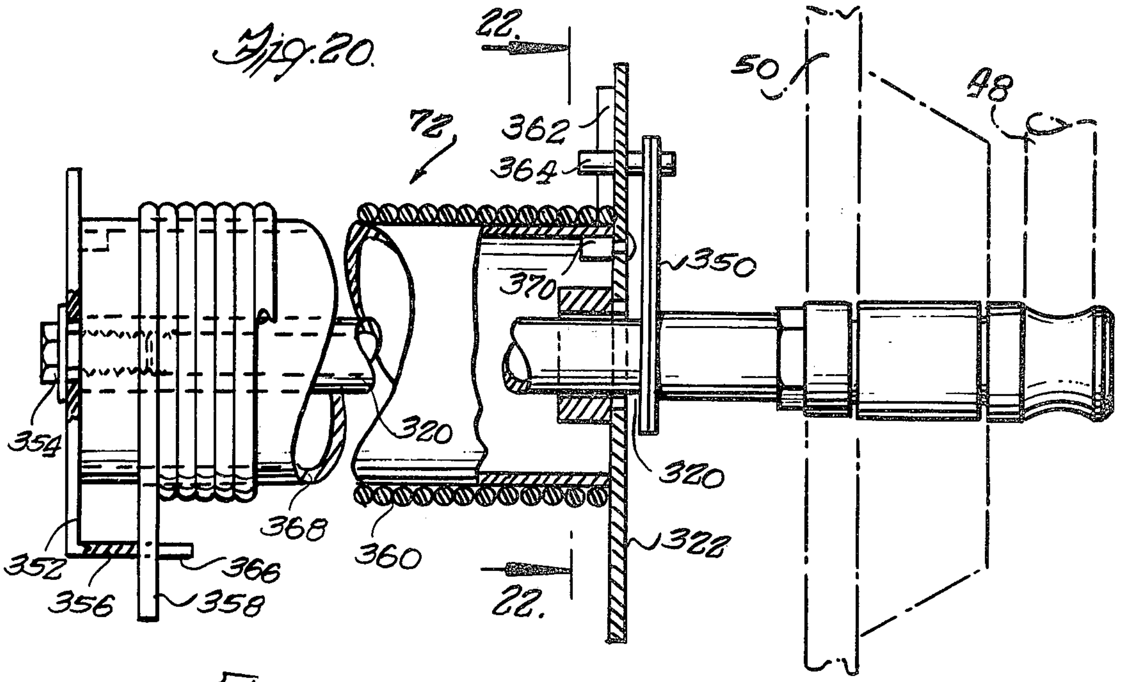
FIG. 20 is a front view of the major components of the excessive energy absorbing mechanism of the present invention.
Figure 23:
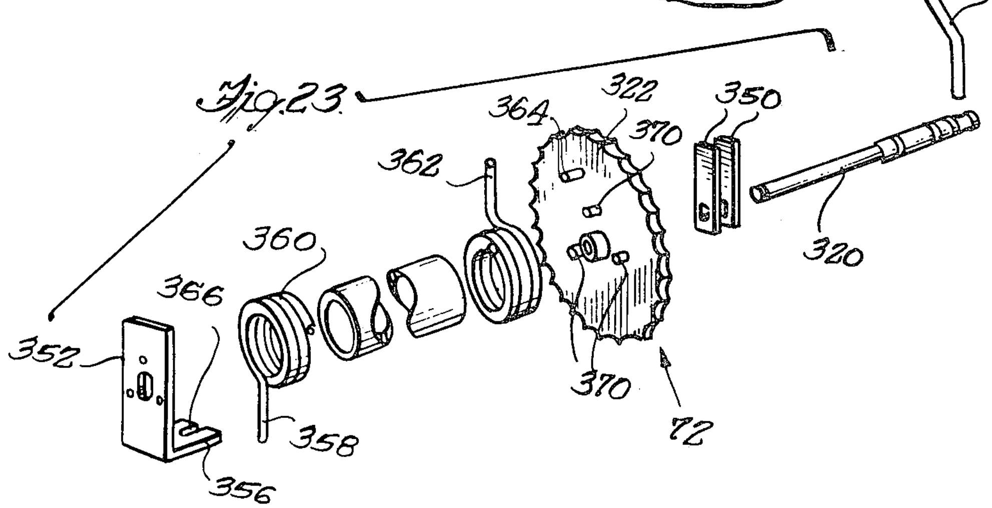
FIG. 23 is an exploded perspective view, with portions removed, of the mechanism shown in FIG. 20.
Figure 29:
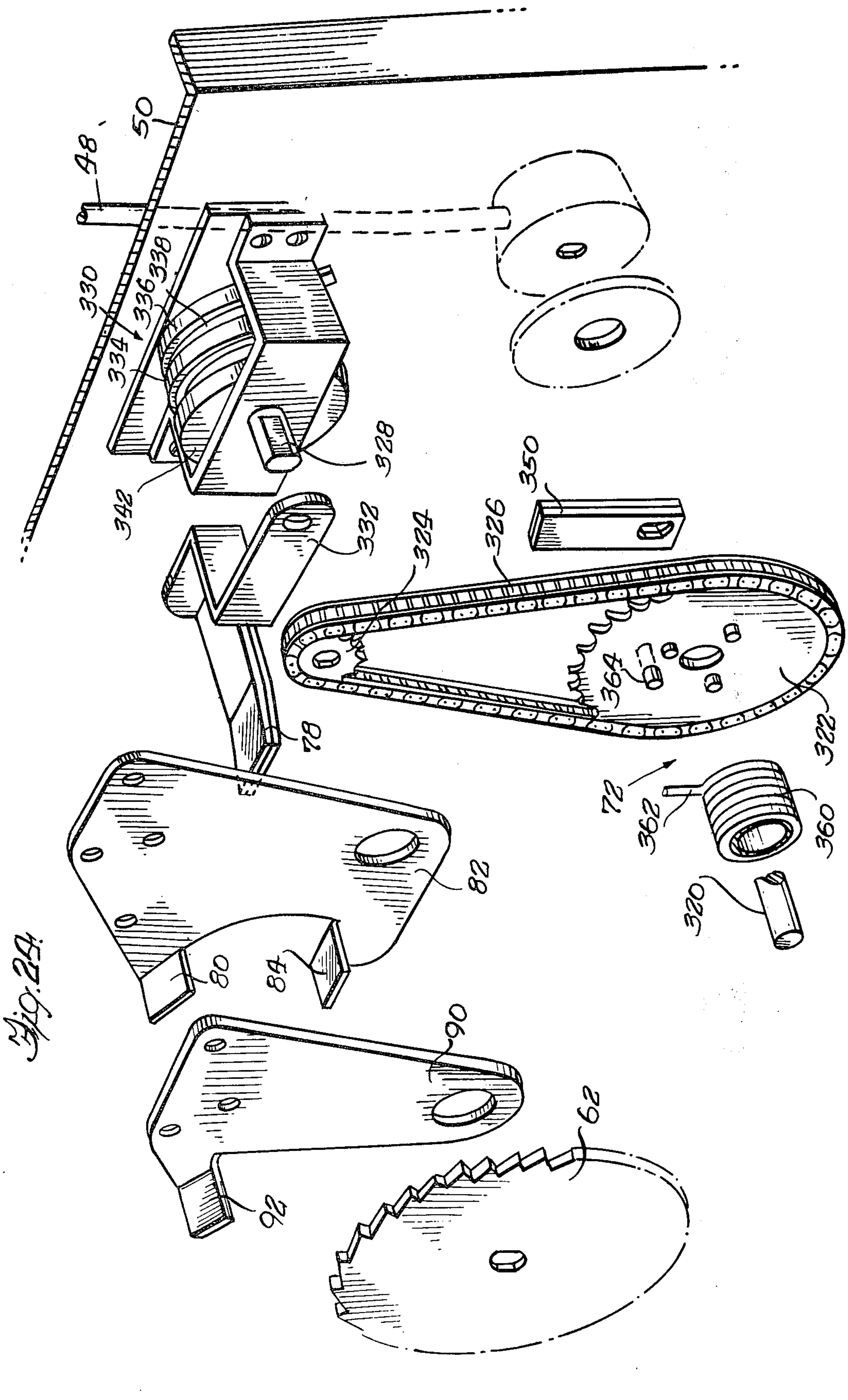

The present invention includes a number of operating mechanisms that are not found in conventional prior art game devices of this type as will be broadly described in connection with FIGS. 1 and 2, and with other figures as is necessary to provide a broad overview of the game device, it being understood that each of the mechanisms will be described in detail as well. Turning initially to FIGS. 1 and 2, a substructure 30 is shown which includes three separate reels 32, which show indicia on their outer periphery for viewing by a player. Each of the reels 32 also has fixedly attached thereto a relatively flat disc 34 having a plurality of notches 36 located along the outer edge generally equally spaced around the circumference of the disc. The discs also include a number of apertures 38 which are used to decode the resulting position of each of the reels 32 upon completion of play to determine if a winning combination has occurred. The discs 34 are attached to the reels 32 and the reels 32 are carried by a common shaft 40 that extends outwardly beyond the left and right substructure side plates 42 and 44 as shown. The reels are provided with one way rotational clutch bearings (not shown) which enable each of the reel and disc combinations to be driven in the drive rotational direction, but which are free to rotate relative to the shaft in the opposite direction. Thus, once the drive shaft 40 has been driven to initiate rotation of the reels, it can be stopped and the reels will continue to rotate until they are individually or collectively stopped even though the drive shaft 40 may have been previously stopped or substantially slowed in its rotation. The shaft 40 is suitably journaled in bearings in the sides 42 and 44 and the sides are also provided with entry slots 46 to facilitate removal of the shaft 40 and the reels that are operatively connected to it. The substructure 30 is suitably placed in an overall amusement or game device enclosure of generally conventional appearance, and which has an operating handle 48 (see FIGS. 20, 23 and 24) which is located outside the enclosure side wall 50 (see FIG. 20).

Pulling of the handle 48 causes movement of a shaft to which a handle is attached to be rotated and this rotational movement is transmitted through a number of mechanisms which result in the shaft 40 being driven at a speed that is proportional to the speed in which the handle 48 is pulled. Thus, in a very real sense, the player can control the initial speed and rotation of the reels 32. Referring again to FIG. 2, the shaft 40 carrying the reels 32 is initially driven by a main drive mechanism 60 that is operatively connected through other mechanisms to the operating handle 48 as will be hereinafter described. The main drive mechanism 60 is operable to engage a ratchet wheel 62 that is fixedly attached to the shaft 40 for rotating the same only during the time during which the handle 48 is pulled. Therefore, once the main drive assembly has been engaged, by virtue of a player inserting a coin or otherwise enabling the game device, the subsequent pulling of the handle 48 will result in rotating force being applied via the main drive mechanism 60 and will impart rotation to the ratchet wheel 62 and shaft 40 during the pulling of the handle 48. Once the handle 48 has been pulled through its complete stroke, the main drive mechanism 60 automatically disengages and the shaft 40 is thereafter free to rotate without any interference from the main drive mechanism.

In accordance with an important aspect of the present invention, if the player pulls the handle 48 too slowly so as to not provide a predetermined minimum rotational velocity to the reels during play, then such slow speed of rotation is detected by suitable speed detection circuitry (not shown). The circuitry may comprise a light circuit with a light emitting diode-phototransistor combination positioned near the disc 34 together with suitable electrical timing circuitry so that if the rotational speed is below a predetermined minimum speed, then a supplemental drive mechanism, indicated generally at 64, and shown in FIG. 1 at the left side of the subassembly 30 is activated, which accelerates the shaft 40 and increases the speed of rotation of the reels. The supplemental drive mechanism 64 engages another ratchet wheel 66 attached to the left end of the shaft 40 which is substantially similar to the ratchet wheel 62 located at the opposite end thereof. The supplemental drive mechanism 64 is also adapted to engage the ratchet wheel 66 only during active operation of the supplemental drive mechanism 64 and it also automatically disengages upon completion of its stroke. Thus, both the main drive mechanism and supplemental drive mechanism provide an initial rotating force to the shaft 40 which is essentially momentary and both mechanisms automatically disengage upon the completion of driving force so that the shaft is not affected by them after their operations are completed.

In accordance with yet another aspect of the present invention, an improved mechanism 70 for stopping each of the rotating reels is provided, which stopping mechanism is also often referred to as an indexing mechanism and which is shown in FIGS. 1, 2, 8–12. The mechanism has a stopping member that is inserted into one of the notches 36 upon activation, which stops the disc 34 and associated reel 32. The improved indexing mechanism disclosed herein is particularly useful where the reels are rotated at a high rotational velocity, i.e., higher than the rotational speeds that have been typically employed in conventional prior art game devices. Although the indexing mechanism disclosed herein is particularly adapted for stopping reels that are rotating at relatively high speed, it is also useful in other game devices of the same general type which have reels that rotate at a relatively lower speed.

While the supplemental drive mechanism is used to increase the speed of rotation in the event the player fails to pull the handle with sufficient speed or force to drive the reels at the predetermined minimum speed, an excessive energy absorption mechanism 72 shown in FIGS. 19–24 is provided and is operatively connected to the operating handle 48 to absorb excessive energy that may be present if the player pulls the operating handle with extraordinary speed or force. This excessive energy absorbing mechanism is needed to protect the main drive mechanism as well as the indexing mechanism, because of the extraordinary speed that could otherwise be generated by a strong or overzealous player.

Figure 25:
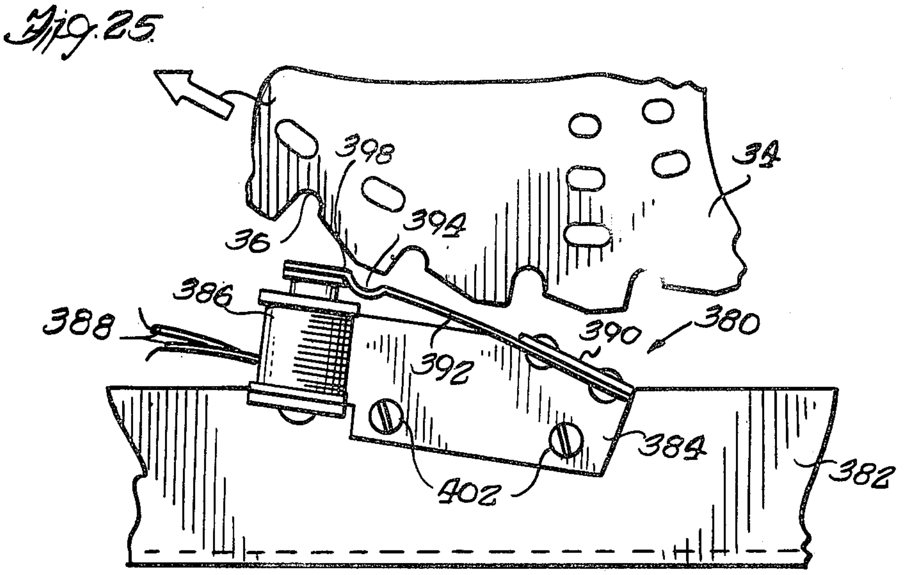
FIG. 25 is a side elevation of the mechanism which provides a slight holding force for holding the reels after the game device has been enabled, but before the reels have been rotated and is shown in its latched or disengaged position.
Figure 26:
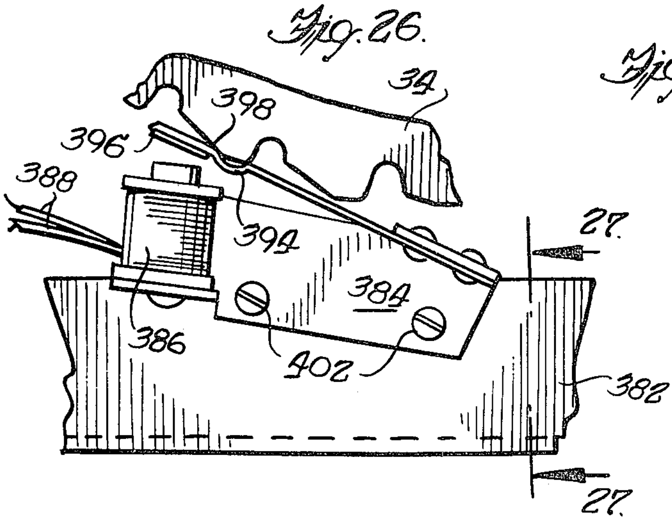
FIG. 26 is a side elevation of the mechanism shown in FIG. 25 and particularly illustrates the mechanism in its unlatched and engaged position; and, FIG. 27 is a cross sectional view of the mechanism shown in FIG. 26 and is taken generally along the line 27—27 thereof.
Figure 27:
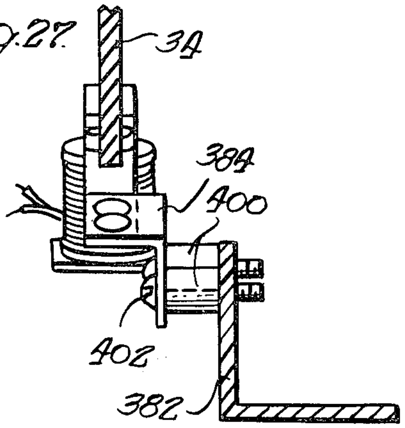

Neither the main drive mechanism 60 nor the supplemental drive mechanism 64 is engaged with the shaft 40 except during active operation and considering the fact that none of the indexing mechanisms 70 are also engaged with the discs during spinning and before they are activated and are in fact retracted into a ready position upon enablement of the game device, such as for example when the player inserts a coin in the apparatus. However, during the time after enablement and before the handle 48 is pulled, the reels are relatively free to rotate and are therefore susceptible to any creeping motion that may be caused by a player shaking or striking the game device for example. In accordance with another aspect of the present invention, a mechanism shown in FIGS. 25, 26 and 27 is adapted to provide a slight resistance to any reel movement during this time. The resistance is in fact slight and needs not to be excessive because no force is being applied at this time that would cause any rotating movement. The mechanism is disengaged upon rotation caused by operation of the main drive assembly which automatically causes the mechanism to be placed in a retracted position.

Figure 3:
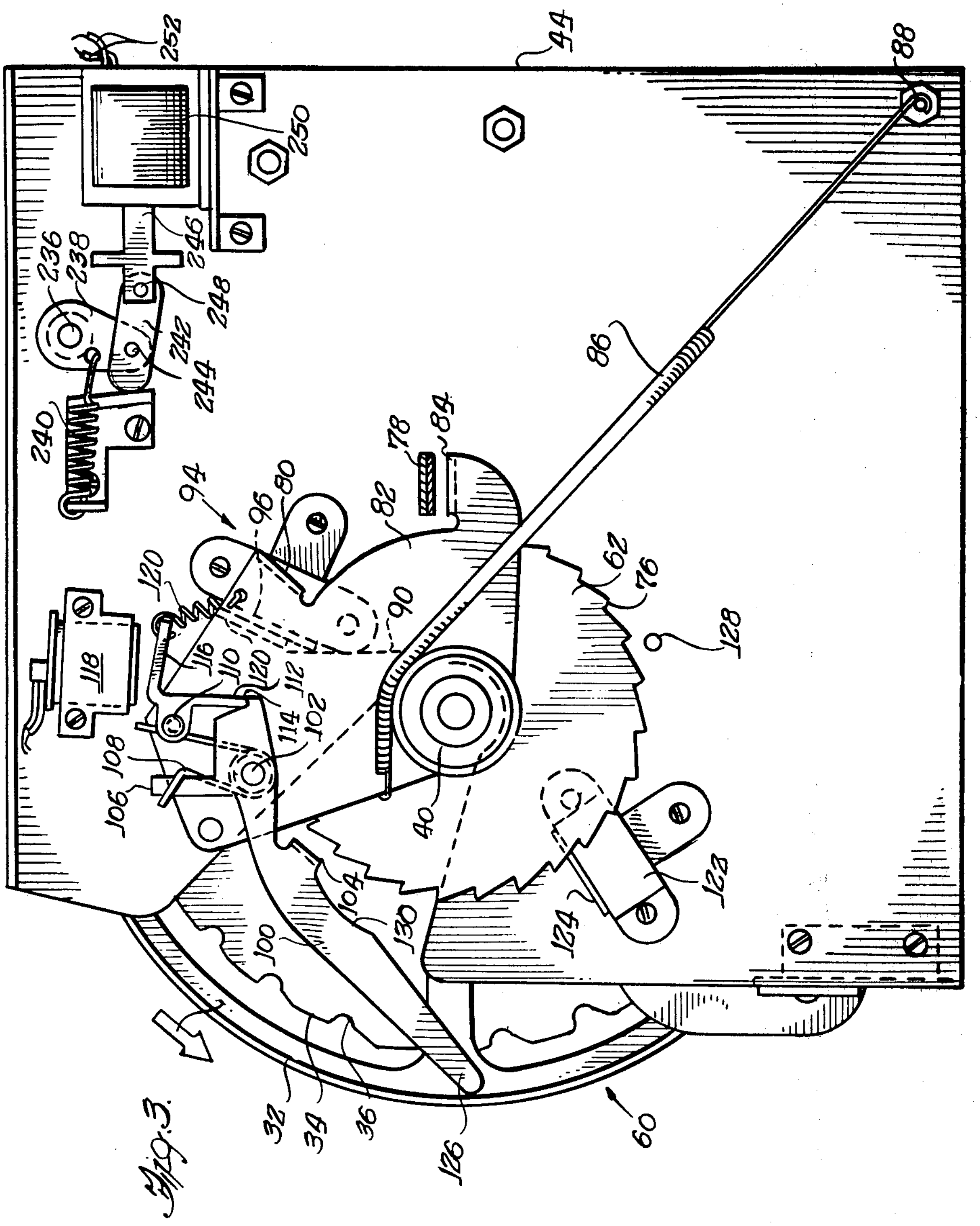
FIG. 3 is a side elevation of the right side of the game device shown in FIGS. 1 and 2, and particularly illustrates the main drive mechanism of the present invention, with the main drive mechanism being shown in a latched and unengaged position.
Figure 5:
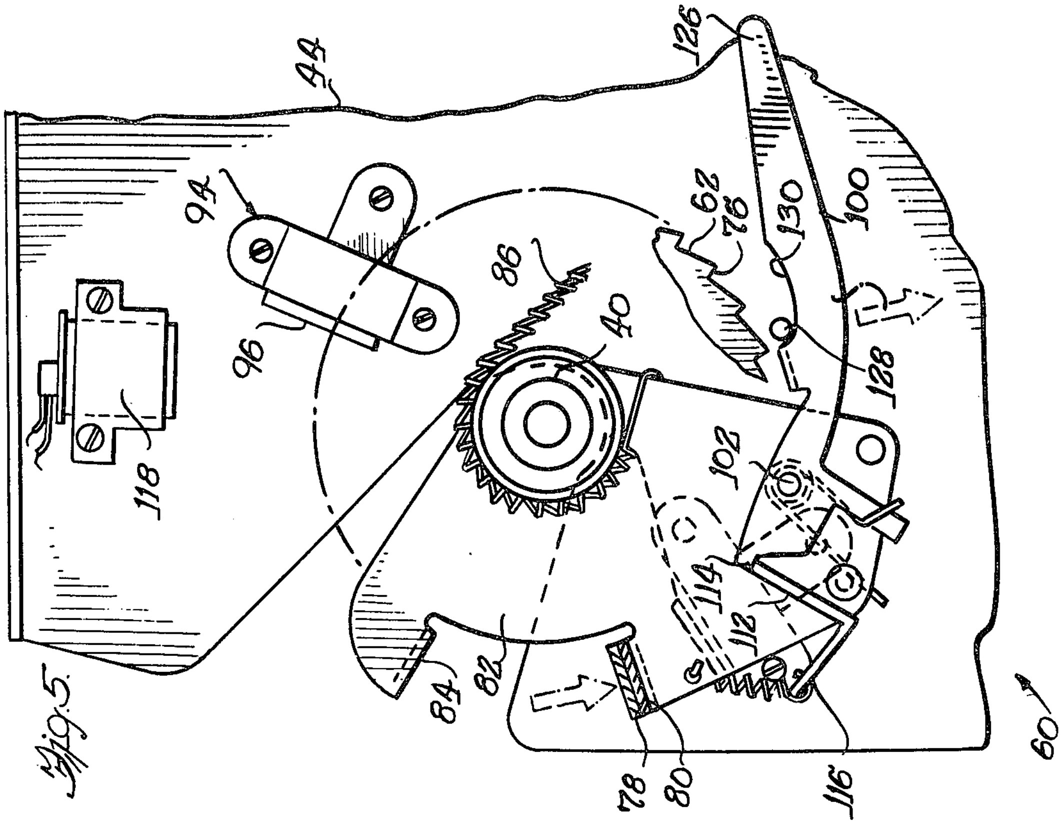
FIG. 5 is a side elevation, similar to FIGS. 3 and 4, and particularly illustrates the main drive mechanism at the position where the handle has been pulled substantially through its entire stroke.
Figure 4:
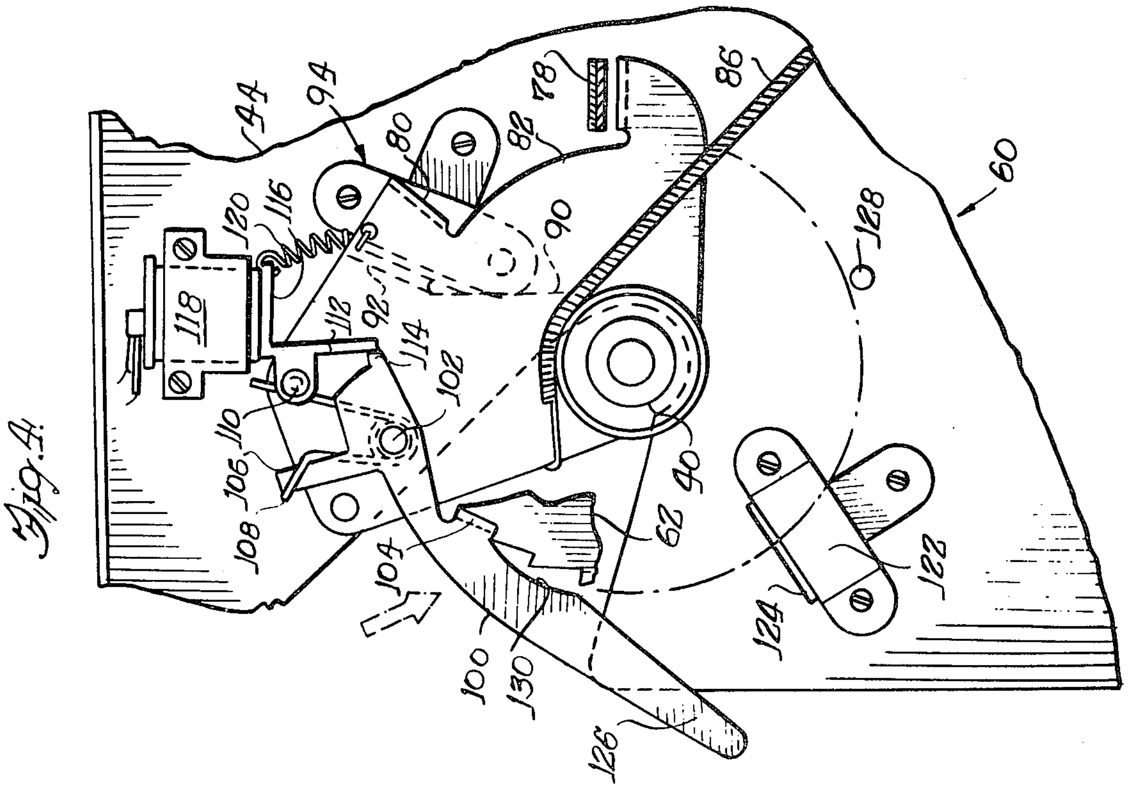
FIG. 4 is another side elevation, similar to FIG. 3, and particularly illustrates the main drive mechanism in its initial position of engagement before the operating handle has moved the mechanism.
Figure 6:
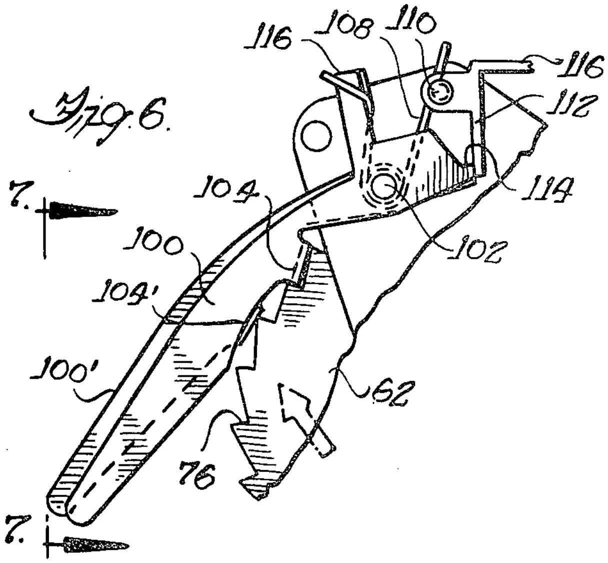
FIG. 6 is a side elevation of a modification of a portion of the main drive mechanism and particularly illustrates the mechanism during initial engagement.
Figure 7:
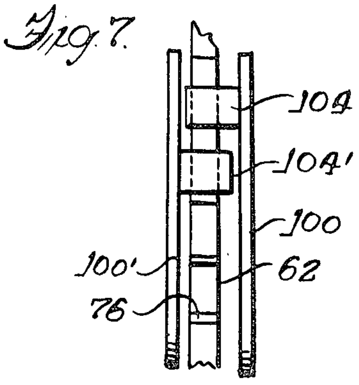
FIG. 7 is a main view of the apparatus shown in FIG. 6 as taken generally along the line 7—7 thereof.

In accordance with an important aspect of the present invention, the detailed construction and operation of the main drive mechanism 60 will now be described in conjunction with FIGS. 3–5, together with an alternative embodiment of a portion of the mechanism which is shown in FIGS. 6 and 7. Referring initially to FIG. 3, the main drive mechanism is illustrated in its latched or ready state wherein it is essentially out of engagement with the shaft 40 and attached ratchet wheel 62. The ratchet wheel 62 has a number of teeth 76, the radially oriented portions thereof being adapted for engagement by an operative drive surface of the main drive mechanism. Pulling of the handle 48 is effective to cause a leaf spring member 78 to escape a pad or transverse extension 80 of a main drive arm plate 82 of the main drive mechanism after the leaf spring member 78 has been angularly moved through an arc of approximately 50° in the counterclockwise direction as shown in FIG. 3. The approximately 50° arc of movement that is provided before engagement with the main drive mechanism permits some degree of play in the handle 48 as is desired. It should be appreciated that pulling the handle 48 through a complete stroke generally involves pulling the handle through an arc of approximately 40° to 60°, which, by virtue of mechanical gearing, results in rotation of the main drive mechanism through the aforementioned 50° before engagement followed by approximately 150° of arc before it reaches the end of its arc, so that the 40° to 60° of angular movement of the handle results in a total rotation of about 190° to 210° of movement by the leaf member 78. It should be understood that the aforementioned values of rotational movement are indeed approximate and can be easily modified by changing the relative sizes of gears, wheels and the like.

The drive arm plate 82 is carried by and is freely rotatable on the shaft 40 and rotates around the shaft 40 in response to movement by the leaf spring member 78 engaging the pad 80. The drive arm plate 82 also has another pad 84 which can be contacted by the leaf spring drive member 78 to return the same to its normal rest and ready position shown in FIG. 3, although a spring 86 having one end connected to the drive arm plate 82 and its opposite end suitably connected to a bolt 88 associated with the side plate 44 may be provided to bias the drive arm plate 82 toward its rest position. The drive arm plate 82 has a second plate component 90 attached thereto which has a transverse extension or pad 92 for engaging a return bumper pad, indicated generally at 94, which preferably has a rubber or rubberlike cushion 96 which contacts the pad 92 upon return. The pad 94 is suitably attached to the side plate 44 and limits the return movement to the position shown in FIG. 3.

The drive arm plate 82 (and plate component 90) carry a drive arm 100 which is pivotally attached to the drive arm plate 82 by a pin member 102. The drive arm 100 has a transverse extension or dog 104 which is engageable with the teeth 76 of a ratchet wheel 62 when the arm 100 is rotated in a counterclockwise direction around the pin member 102. An extension 106 is also provided for contact by a coil spring 108 which bears against the extension 106 as well as against a second pin member 110 which also carries a pivotable armature latch 112 preferably fabricated from a ferromagnetic material. The spring 108 biases the drive arm 100 toward engagement with the ratchet wheel 62, but is held out of engagement in its latched position shown in FIG. 3 by a release dog surface 114 that is engaged by the end of the latch 112. The latch 112 is rotatable around the pin member 110 and is a generally right angled member having a surface 116 which is adjacent a coil 118 which is adapted to pivot the latch member 112 in a counterclockwise direction, i.e., attract the portion 116 toward the coil 118 when the coil 118 is energized. When this occurs, the latch 112 is released from the drive arm dog 114 which permits it to move so that its dog 104 will engage one of the teeth 76 of the ratchet wheel 62. The drive arm 100 is shown in the engaged position in FIG. 4 after the latch 112 has released the drive arm 110 for engagement. A spring 120 is provided to bias the latch 112 in the counterclockwise direction to maintain engagement with the drive arm dog 114. After the dog 104 is engaged with the ratchet wheel 62, then the leaf member 78 engaging the pad 80 of the drive arm plate 82 and rotating the same will drivingly rotate the ratchet wheel 62 and thereby spin the reels 32.

As the leaf spring member 78 rotates the drive arm plate 82 through the complete arc, the pad 92 of the component 90 will approach and eventually contact an end of stroke bumper 122 which has a cushion 124 which actually contacts the pad 92 and limits its counterclockwise movement. However, before it reaches the end of stroke, the outer free end 126 of the drive arm 100 will approach a disengaging pin 128 and by virtue of the contact with the surface 130 of the drive arm 100 will cause the free end 126 to move downwardly as shown in FIG. 5, out of engagement with the teeth 76 of the ratchet wheel 62, effectively rotating the drive arm 100 in a clockwise direction around its pivot pin member 102. As the arm 100 is moved farther away from the ratchet wheel 62, the release dog 114 will clear the end of the latch 112 which, by virtue of the biasing spring 120, will cause it to again latch the drive arm 100 in the position shown in FIG. 3 and as the operating handle 48 is returned to its normal rest position, the leaf member 78 will be rotated in a clockwise direction back to its rest position shown in FIG. 3 and the main drive mechanism will again be in its ready position, ready to operate in response to a subsequent play by a player. It should be appreciated that the coil 118 is preferably energized in response to the acceptance of a coin being placed into the game device by the player, although it may be operated in response to a signal that is received after all reels have been stopped, for example, if the device is not of the coin operated type. An important consideration is that the ratchet wheel not be rotating at the time the latch 112 is released.

A modification of the main drive mechanism is shown in FIGS. 6 and 7 and includes a second drive arm 100' which is very similar in shape and operation to the previously described drive arm 100, with the primary difference being that it has a extension or dog 104' that is spaced from the drive arm dog 104 by a small distance. The drive arm 100' is pivotable around the pin 102 independently of the pivoting action of the drive arm 100 so that upon release by the latch 112, both of the drive arms will be biased toward engagement and depending upon the precise angular position of the ratchet wheel 62, one or the other of the dogs 104, 104' will engage one of the teeth 76 of the ratchet wheel 62. When the drive plate 82 has been rotated through the complete arc, the pin 128 will engage both of the drive arms 100 and cause the latch 112 to relatch both of the drive arms 100, 100' into the position shown with respect to the drive arm 100 in FIG. 3. The additional drive arm may be desirably included in the main drive mechanism to insure that engagement is achieved by the dog 104 or 104' rather than to possibly "bounce" radially outwardly relative to the ratchet wheel 62 upon initial rotation of the drive arm plate 82.

To stop the rotating wheels once they have been rotated by the main drive mechanism 60 or possibly by the main drive mechanism 60 followed by the supplemental drive mechanism 64, one of the index mechanisms 70 is provided for each reel and one of the indexing mechanisms 70 is shown in FIGS. 8–12 of the drawings. Referring initially to FIG. 8 which shows the indexing mechanism 70 in its normal or ready state, it stops the rotating reels by being released at the appropriate time whereupon a stop roller member 140 carried by a pin 142 engages one of the notches 36 of the disc 34. Because the disc 34 may be rotating at an extremely high speed, or at least higher than has been generally previously experienced by conventional prior art game devices of the type described herein, stopping the disc 34 and reels 32 may result in considerable shock because of the higher speed and the stopping may result in a reaction in the opposite direction after initial engagement by the stop member 140, i.e., in a clockwise direction which is opposite that shown by the arrow 144.

To cushion or otherwise absorb some of the shock that is experienced during initial engagement by the stop roller member 140 as well as to absorb the reaction in the opposite direction, the indexing mechanism is provided with shock absorbing capability. Moreover, the structural mass that is actually moved to engage the stop member 140 with one of the latches is minimized as a result of the unique design compared with many conventional indexing mechanisms so that it will rapidly fully enter a notch 36 in a way whereby the disc will be readily stopped without the stop member bouncing along the edge and entering a notch that may be several notches removed from the notch which was initially encountered. By virtue of the small amount of mass that is moved during the engagement of a notch, it can rapidly enter a notch and fully engage the same to stop the disc 34.

Turning initially to FIG. 8, the indexing mechanism 70 is shown to have an elongated indexing slide arm 146 which is slideably secured to a mounting bracket 148 at its lower end and its upper end is shown to have a bifurcated end portion with one side 150 being integral with the lower portion of the index slide arm 146, the other side 152 (see FIG. 12) being of generally similar shape and attached to the first side 150 by a number of fasteners 154 which may be screws, rivets or the like. The bifurcated end has a transverse extension 156 with a pair of apertures 158 and 160 (see FIG. 12) for receiving suitable connecting pins for holding other components that will be hereinafter discussed. The aperture 158 is generally in line with the longitudinal direction of the index slide arm 146 and a pin 162 holds one end of a flat elongated link 164, the opposite end of which is connected to one end of the pin 142 that carries the stop roller member 140. An aperture 166 is located at a position similar to that of the aperture 158, but in the other side 152 of the bifurcated end of the slide arm 146 and it receives a pin (not shown) for holding an index pivot arm 170 in which the other end of the pin 142 carrying the stop roller member 140 is also secured. The link 164 and pivot arm 170 therefore pivot around the pins 162 and 142 and are thereby adapted to rotate in a counterclockwise direction into engagement with a notch, when the index pivot arm 170 is released.

The pivot arm 170 has an extension 172 to which one end of a tension spring 174 is attached, the opposite end thereof being connected to an aperture 175 in the bifurcated side 152. The spring 174 acts on the pivot arm 170 and biases the same toward engagement with the disc 34. The pivot arm 170 has a dog 178 which is engaged by a transverse extension 180 of a latch member 182 that is carried by and is pivotally attached to the extension 156 by a pin 184. The latch 182 is preferably fabricated of a ferromagnetic material and has a second transverse extension 186 for interaction with an operating coil 188 that will attract the extension 186 of the latch 182 and cause the same to rotate in a clockwise direction as shown in FIG. 8 when the coil is energized through electrical leads 190. The latch 182 has an extension 192 which provides a surface edge for contact by one end of a spring 194, the opposite end of which bears upon an edge of the transverse extension 156. The spring 194 is wrapped around the pin 184 and biases the latch in the counterclockwise direction so that the extension 180 will be maintained in contact with the dog 178 of the pivot arm 170 to hold the pivot arm in its latched position shown in FIG. 8.

Once the coil 188 is energized and thereby attracts the latch 182 causing it to be moved in the clockwise direction, the extension 180 will disengage the dog 178 and permit the pivot arm to move toward the disc 34 so that the stop roller member 149 can engage a notch and stop the disc and associated reel. To facilitate rapid movement of the pivot arm 170, its overall weight is preferably minimized and to this end, a circular portion 196 is removed from the center portion thereof.

Figure 9:
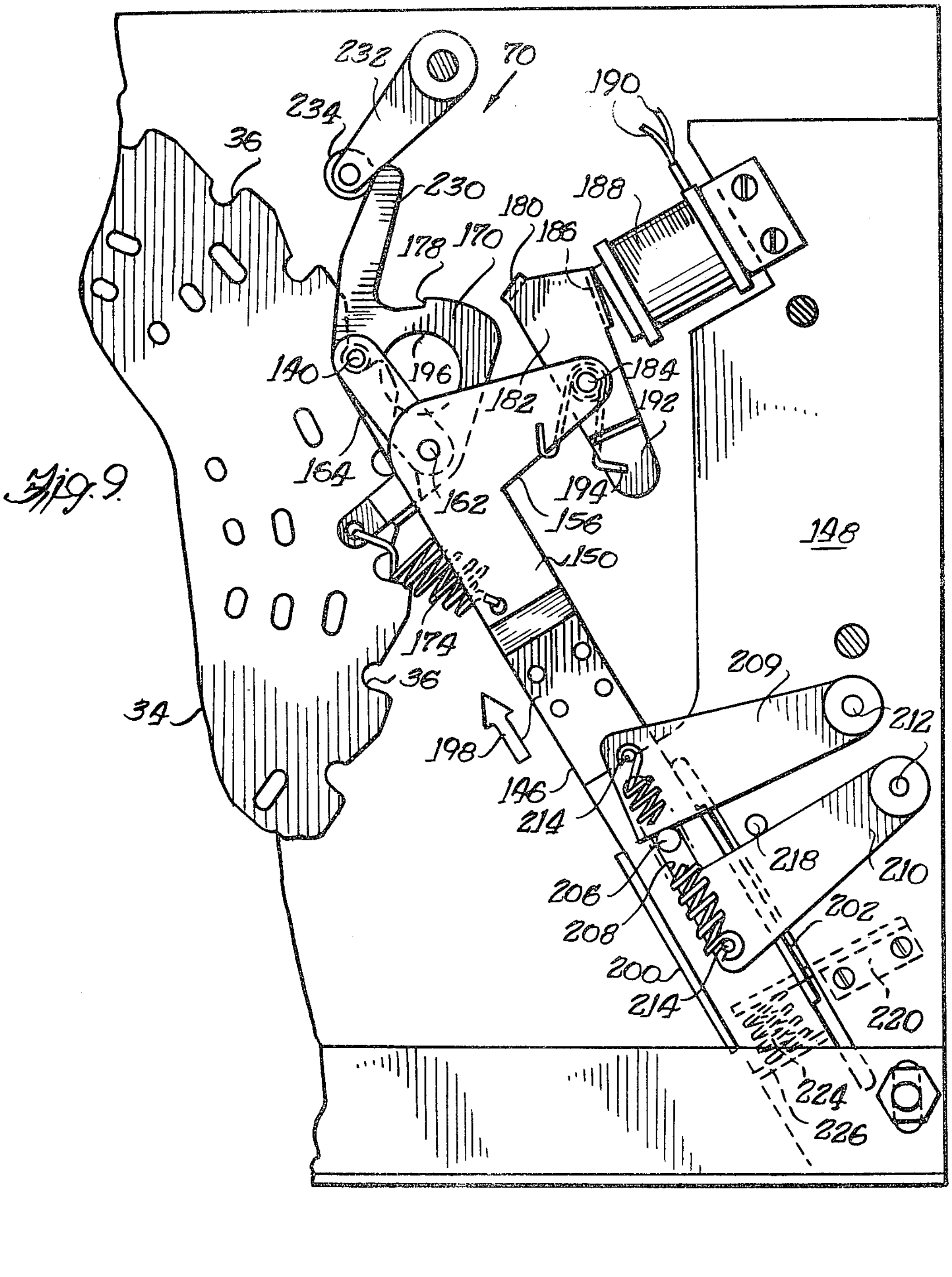
FIG. 9 is another side elevation similar to that shown in FIG. 8 and particularly illustrates the stopping mechanism in its engaged position, immediately after engagement when the rotational momentum has extended the stopping mechanism in the direction of rotation.

Once the pivot arm has been released and the stop roller member 140 has engaged a notch, as shown in FIG. 9, the momentum of the disc 34 will be in the direction of rotation which is counterclockwise which will result in a force being applied to the indexing mechanism 70 in the direction of the arrow 198. It should be appreciated that the orientation of the stop member 140 when engaged is generally in line with the longitudinal direction of the index slide arm 146 so that the force is applied generally in the longitudinal direction of the slide arm 146 as is desired. In this regard, the index slide arm 146 is mounted on the mounting plate 148 so that it is generally aligned tangentially of the circumference of the disc 34 at the location of the particular notch where the stop member 140 will be engaged.

To cushion the initial shock that is experienced by the index mechanism 70, the index slide arm 146 is provided with the capability of being moved along a path aligned with the longitudinal direction thereof and in both directions from the rest position which is illustrated in FIG. 8. Upon engagement of the stop member with a notch as is shown in FIG. 9, the slide member 146 can move upwardly as shown in FIG. 9 and it can also move downwardly as may be experienced by initial recoil or reaction to the stopping and the downward movement of the slide member 146 is particularly illustrated in FIG. 10.

The sliding movement of the index slide arm 146 is permitted by the manner in which the arm 146 is attached to the mounting plate 148. More particularly, the lower portion of the index slide arm 146 has a pair of transverse elongated extensions 200 and 202, with the latter fitting within an elongated slot 204 of the mounting plate 148. The slide arm 146 also carries a pin 206 which fits in a shorter elongated slot 208 of the mounting bracket, the ends of which provide a stop surface which limits the extent of sliding movement of the index slide arm 146.

To provide resistance to the sliding movement and to maintain the index slide arm 146 in a centered position, a pair of centering arms 209 and 210 are provided, with one end of each of the centering arms being rotatably attached to the mounting bracket 148 with pins 212. The opposite ends of the centering arms also have attachment pins 214 to which a tension spring 216 is connected and the spring acts to keep the centering arms biased toward one another. A pin 218 is attached to the mounting plate 148 and is adapted to contact the sides of both centering arms 209 and 210 when the slide arm is in the rest or centered position as shown in FIG. 8. When force is applied which tends to move the index slide arm 146 upwardly as shown in FIG. 9, the pin 206 will engage the centering arm 209 and force it away from the pin 218 against the resistance provided by the spring 216.

Figure 10:
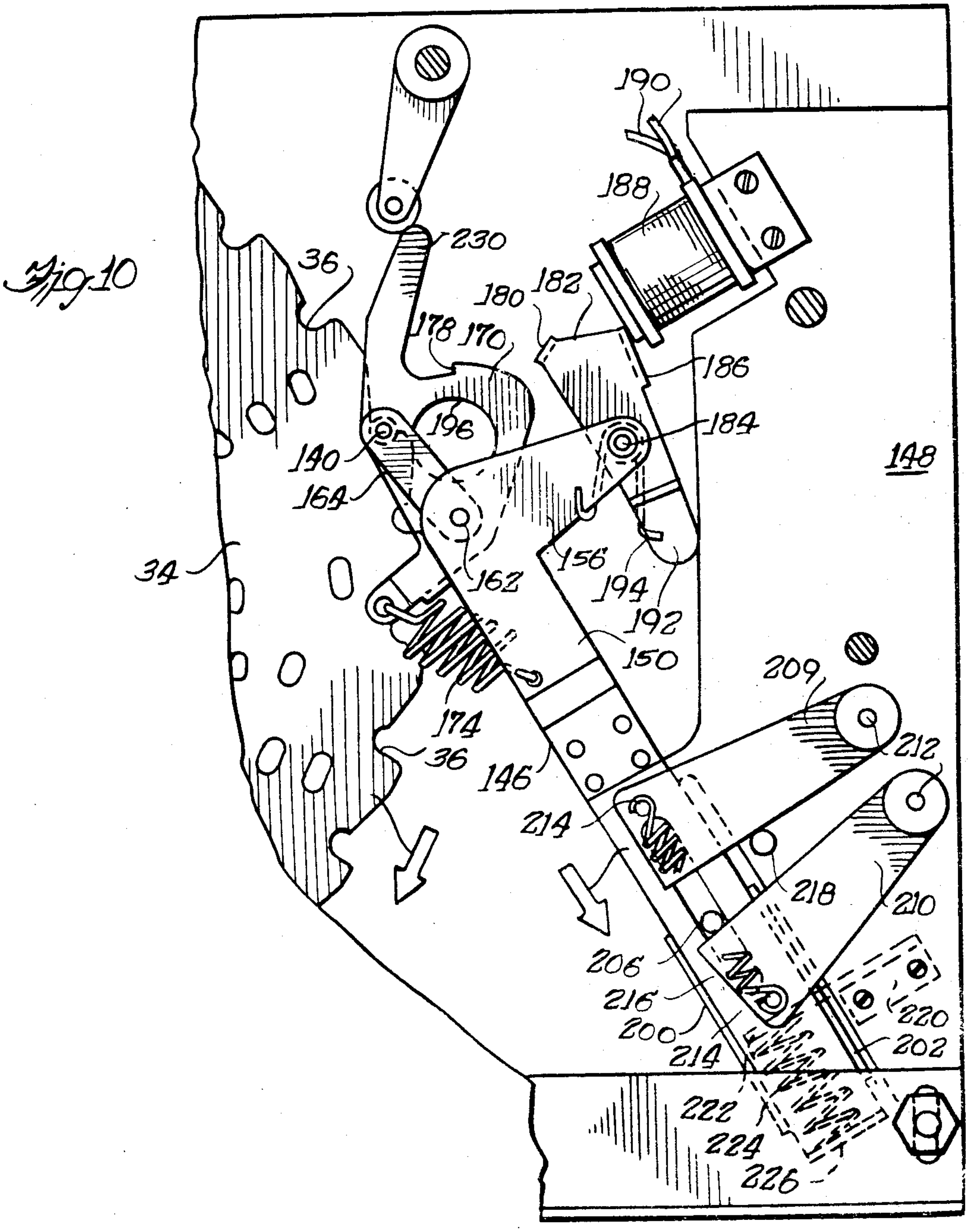
FIG. 10 is yet another side elevation of the stopping means and is similar to FIG. 8, and particularly illustrates the stopping mechanism immediately after stopping when reaction has caused the mechanism to be moved in an opposite direction relative to that shown in FIG. 9.
Figure 12:
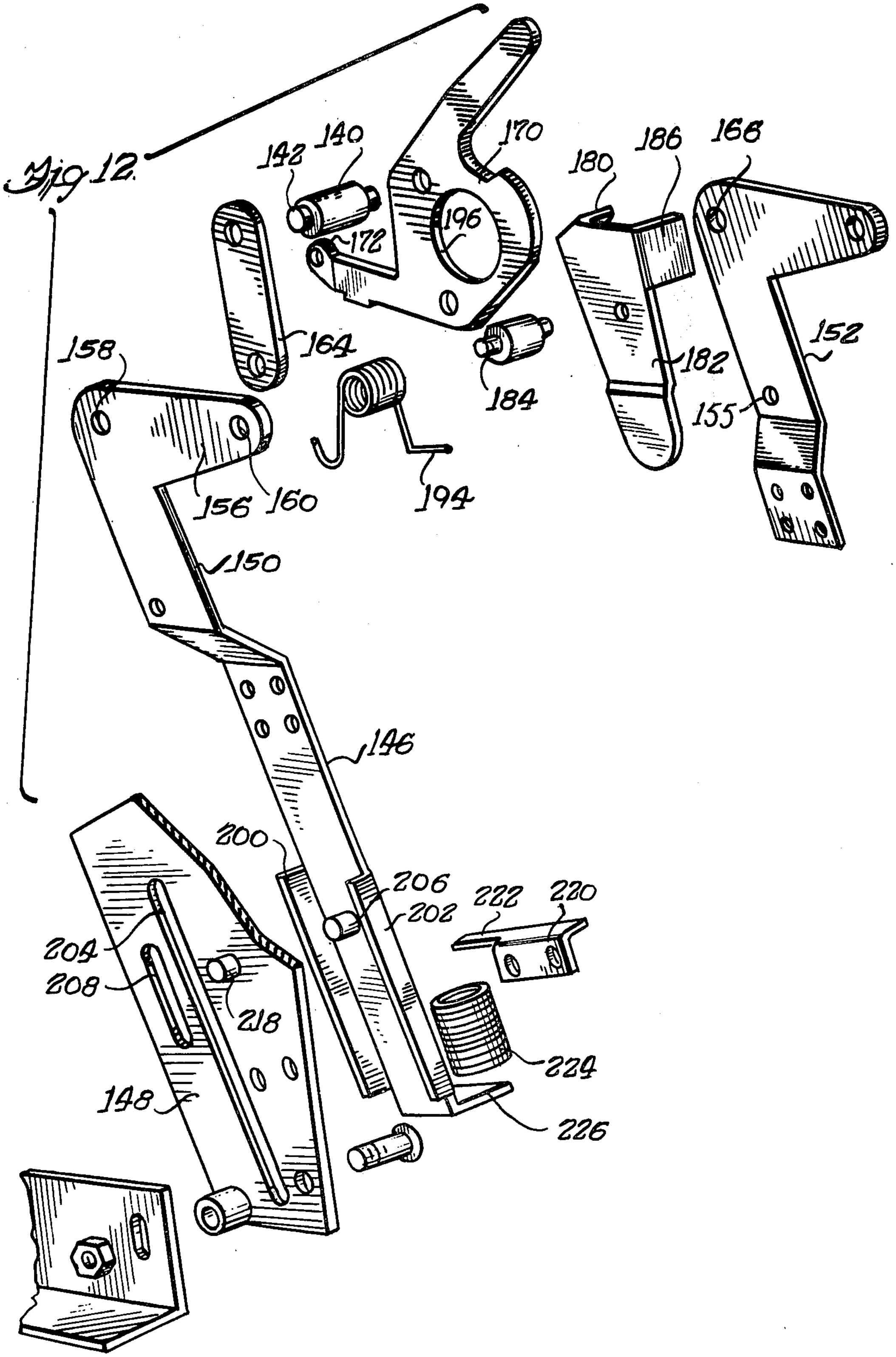
FIG. 12 is an exploded perspective view of substantially all of the components of the stopping mechanism shown in FIGS. 8–11.

In the event the action of the disc 34 reacts to the movement and produces a force in the downward direction on the index centering arm 146, it will cause the lower slide arm 210 to be moved away from the pin 218 by means of the slide arm pin 206 acting on the edge thereof as shown in FIG. 10 and the force of the spring 216 will resist downward movement of the index slide arm 146. The spring 216 will then return the centering arm 210 into contact with the pin 218 and the slide arm will again be at its rest position. Since the upward force will generally be much greater than the reactive downward force, a supplemental and stronger resistance to such movement may be provided. In this regard, a bracket 220 may be attached to the mounting plate 148 and have an extension 222 to which a compression spring 224 may be attached for engagement with a transverse flange 226 of the index slide arm 146. Thus, as the index slide arm is moved upwardly in the direction of the arrow 198 shown in FIG. 9, the spring 224 will come in contact with the transverse flange 226 and provide added resistance to further upward movement.

To remove the index pivot arm 170 from the disc 34 after the disc has been fully stopped to thereby permit the player to again play the game apparatus, the index pivot arm 170 is provided with an extension 230 that is adapted to be contacted by a reset mechanism that includes a reset arm 232 having a roller 234 at the outer end thereof. The reset arm is secured to a shaft 236 that preferably extends substantially the full width of the substructure 30 with each indexing mechanism 70 having a reset arm 232 located immediately adjacent to it. When the reset mechanism is activated, it will move in the counterclockwise direction around the shaft 236, contact the reset extension 230 moving it in a clockwise direction around the pin 162 and thereby pivot the index pivot arm into latching engagement with the latch extension 180 and thereby latch the same in its retracted position shown in FIG. 8. The reset mechanism that drives the shaft 236 is shown in FIG. 3 to include a reset arm 238 attached to the shaft 236 with the arm 238 being biased by a tension spring 240 for maintaining the arm in the position shown and the other end of the arm 238 is connected to a link 242 by a pin 244, the other end of the link being connected to a plunger 246 by a pin 248, the plunger 246 being a part of a solenoid 250 which is energized via lines 252. When the solenoid is energized the plunger is pulled to the right which causes the plunger 246, link 242, arm 238 to be moved to the right as shown which causes the shaft 236 to be rotated in a counterclockwise direction as is required for the resetting action.

Figure 14:
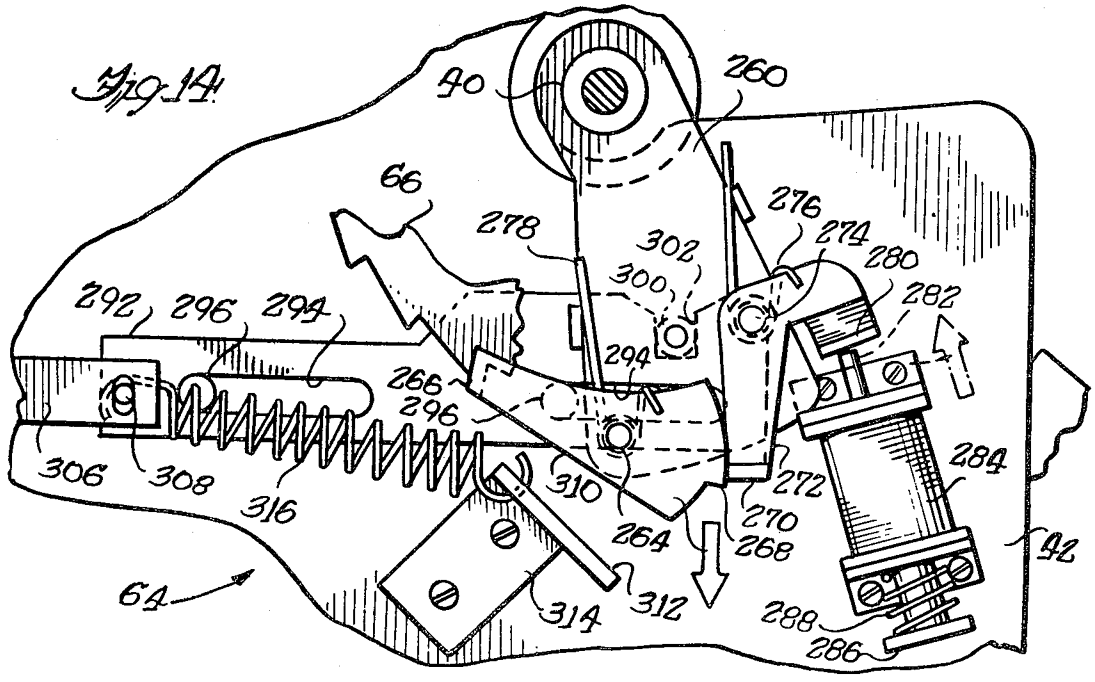
FIG. 14 is an enlarged side elevation of the supplemental drive mechanism shown in FIG. 13 with portions removed for the sake of clarity and particularly illustrates the supplemental drive mechanism in a position where it is unlatched and engaged, but before full activation.
Figure 15:
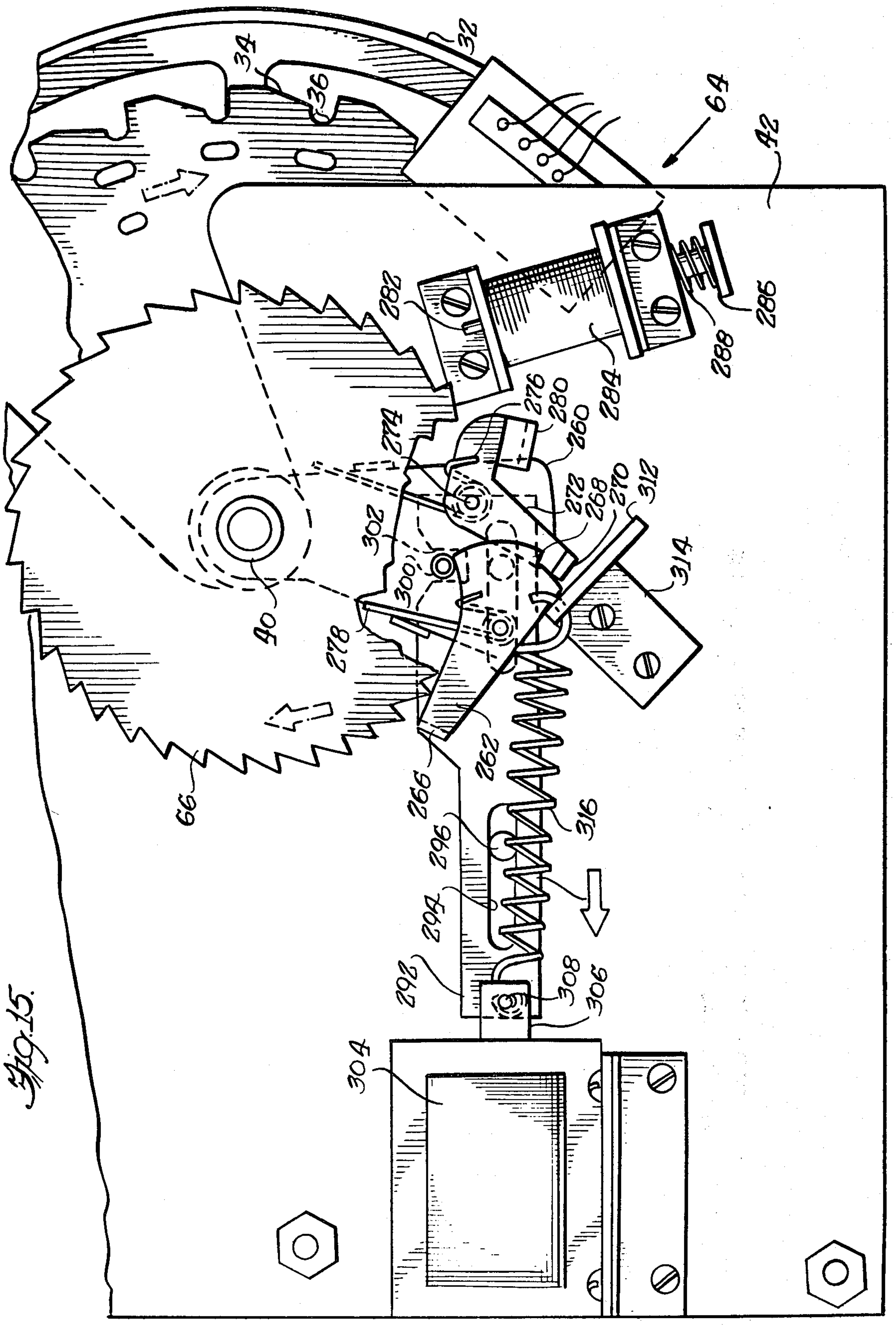
FIG. 15 is another side elevation of the supplemental drive apparatus similar to that shown in FIGS. 13 and 14, but illustrating the mechanism immediately upon completion of operation whereby it is being substantially relatched but not returned to its ready position.
Figure 16:
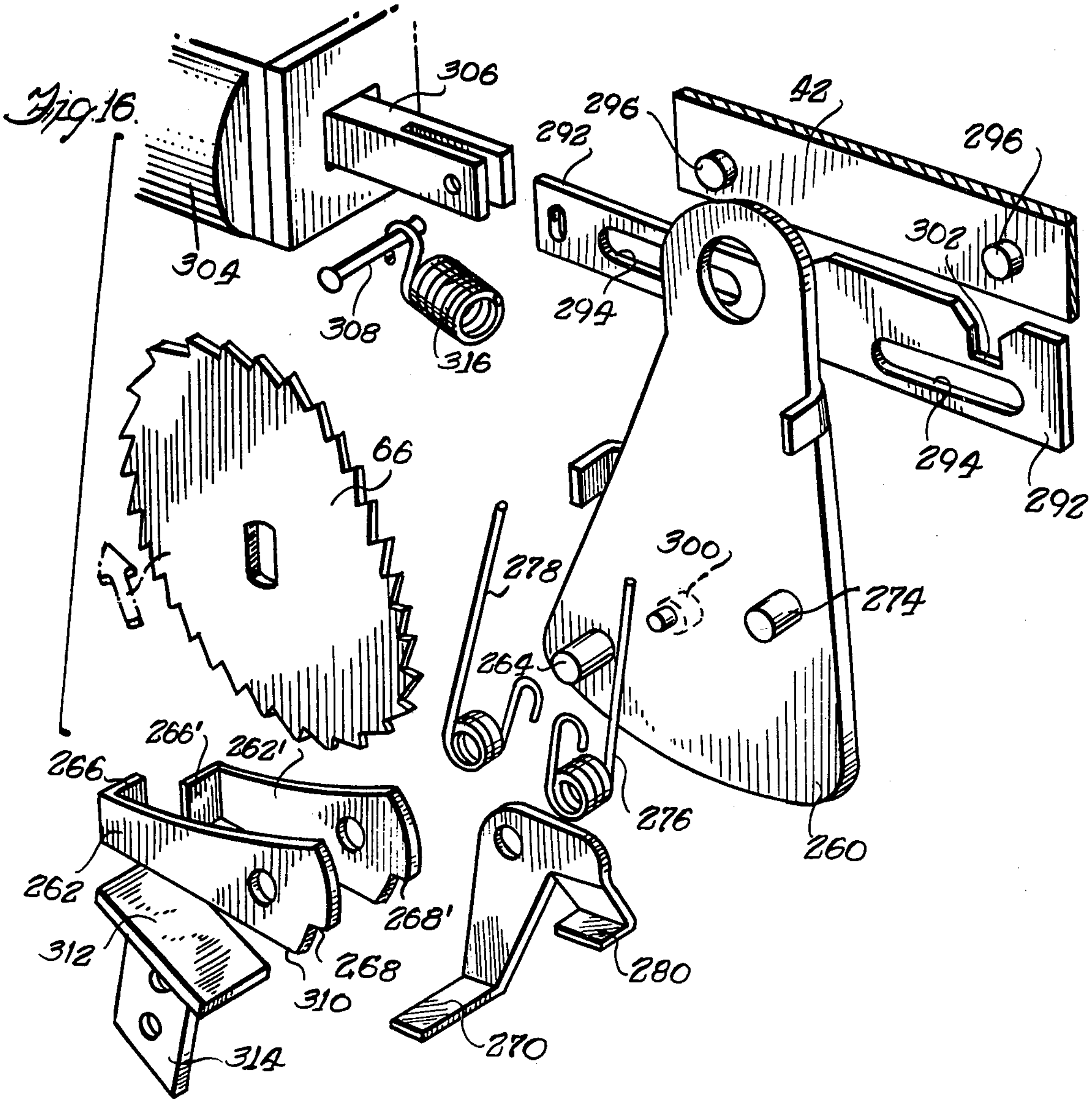
FIG. 16 is an exploded perspective view of the major components of the supplemental drive mechanism shown in FIGS. 13–15 and particularly including a slight modification of a portion of the apparatus thereof.
Figure 18:
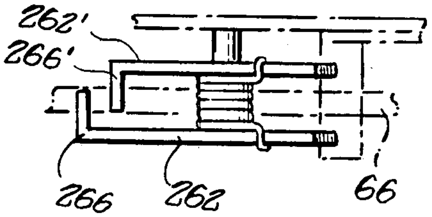
FIG. 18 is a bottom view of the modification shown in FIG. 17.
Figure 17:
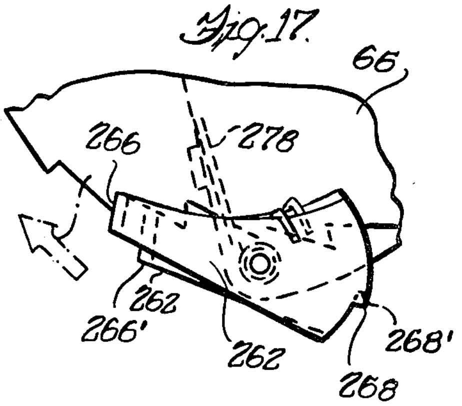
FIG. 17 is a side view of the modification of the supplemental drive mechanism shown in FIG. 16.
Figure 19:
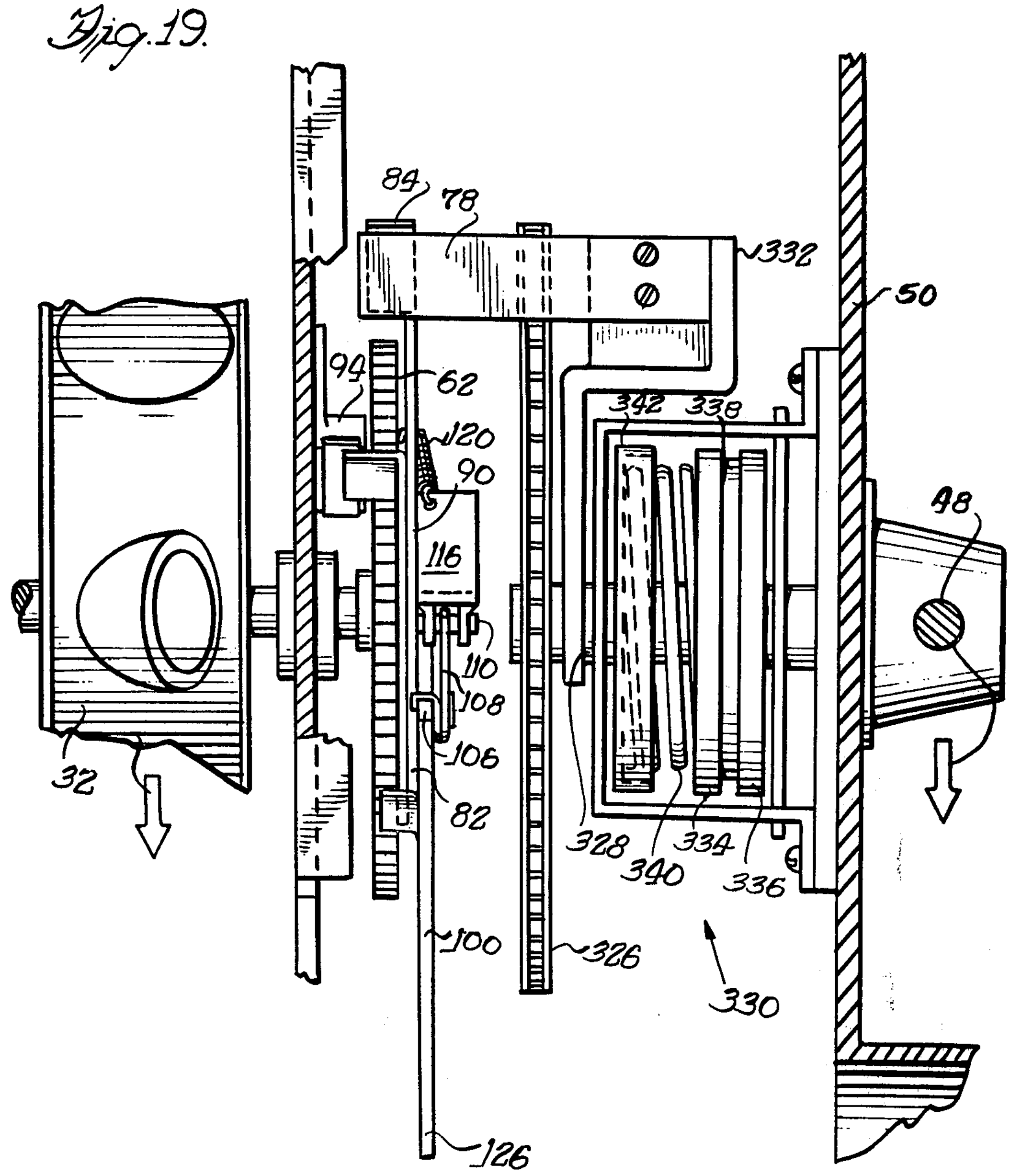
FIG. 19 is a top plan view of a portion of the apparatus shown in FIGS. 1 and 2 and particularly illustrates the excessive energy absorbing mechanism of the present invention shown together with the main drive mechanism thereof.

As previously mentioned, in the event that the player pulls the handle with insufficient force or speed to cause the reels to initially rotate at a speed that is below the predetermined minimum speed, then such event will be detected by suitable speed detection means associated with at least one of the reels or the shaft 40. If the reels are detected to be moving too slowly, the supplemental drive mechanism 64, shown broadly in FIG. 1, and in detail in FIGS. 13 through 16, will be activated. The supplemental drive mechanism 64 is shown in its ready or rest position in FIG. 13, initially engaged with the ratchet wheel 66 in FIG. 14 and at the end of its power stroke in FIG. 15. An exploded perspective of the mechanism is shown in FIG. 16 and an alternative embodiment of a portion of the apparatus is shown in FIGS. 17 and 18.

Referring again to FIG. 13, the supplemental drive mechanism has a drive plate 260 that is carried by and is freely rotatable relative to the shaft 40. The drive plate 260 carries a ratchet pawl 262 that is attached thereto by a pin 264 around which it can rotate. The pawl 262 has a transverse extension 266 for engagement with the teeth of the ratchet wheel 66 when the pawl 262 is rotated in a clockwise direction into said engagement. However, the pawl 262 has a dog 268 that is engaged by a transverse extension 270 of a pawl latch 272 that is also carried by and is attached to the drive plate 260 by a pin 274. The pawl latch 272 has a coil spring 276 that normally biases the pawl latch in a clockwise direction, i.e., so that the extension 270 normally is biased into engagement with the dog 268 of the ratchet pawl 262. The ratchet pawl 262 is also biased toward the ratchet wheel 66 by a coil spring 278 which has one end bearing against the ratchet pawl 262 and the opposite end bearing against the edge of the drive plate 260 as shown in FIGS. 14 and 15. Thus, from the foregoing, it should be appreciated that when the latch 272 is operated so that the extension 270 separates from the dog 268, then the ratchet pawl 262 will be biased to move in a clockwise direction around the pin 264 which will cause the extension 266 to engage the teeth of the ratchet wheel 66.

Figure 13:
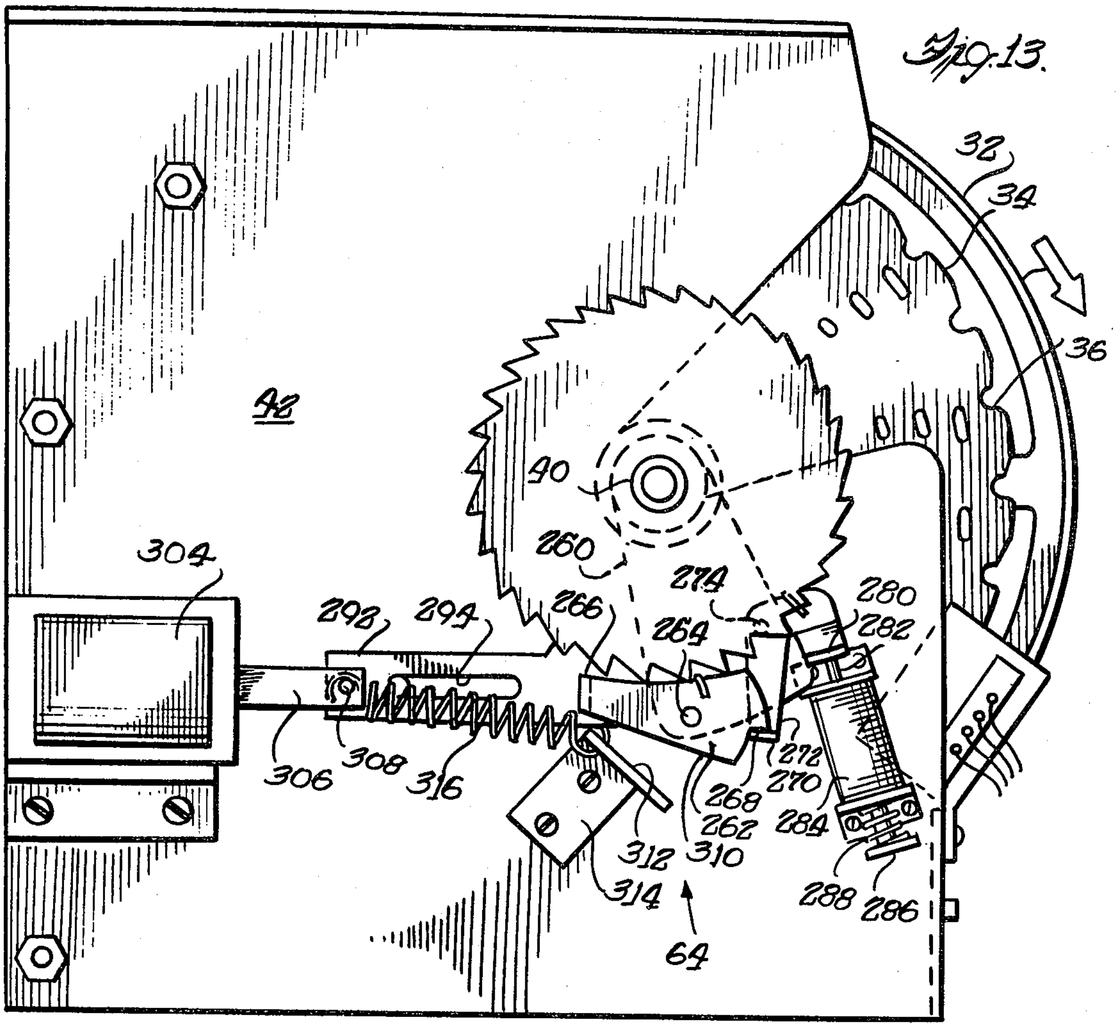
FIG. 13 is a side elevation of the left side of the apparatus embodying the present invention and particularly illustrates the supplemental drive mechanism, with the same being shown in the disengaged and ready position.

To unlatch the ratchet pawl 262, the latch 272 has a transverse extension 280 which is engaged by an extendable plunger 282 of a solenoid 284, the opposite end of the plunger 282 having a flange 286 against which a compression spring 288 bears to normally bias the plunger toward its retracted position as shown in FIGS. 13 and 15. The solenoid 284 is suitably attached to the substructure side plate 42. When the solenoid is energized, the plunger 282 is forced upwardly as shown in the drawings into contact with the extension 280 and rotates the latch 272 in a counterclockwise direction around pin 274, thereby releasing the extension 270 from the dog 268 so that the spring 278 biases the ratchet pawl into engagement with the ratchet wheel 66.

To drive the drive plate after the ratchet pawl 262 has engaged the ratchet wheel as shown in FIG. 14, a drive arm 292 is provided which has a pair of elongated slots 294 which receive a pair of generally horizontally disposed pins 296 which guide the drive arm 292 so that it slides along a generally horizontal path. The drive arm 292 is operatively connected to the drive plate 260 by a pin 300 that engages an upwardly directed slot 302 located in the drive arm 292. The drive arm 292 is preferably secured to the side wall 42 by locking washers or the like attached to the pins 296 and the open slot 302 enables much of the supplemental drive arm assembly to be removed when the shaft 40 carrying the reels and the like is removed.

Thus, when the drive arm 292 is pulled to the left it will rotate the drive plate 260 in a clockwise direction and impart rotating force to the ratchet 66 and therefore the shaft 40. A solenoid 304 is also suitably mounted to the side 42 and it has a retractable plunger 306 that is connected to the drive arm by a pin 308 or the like so that energization of the solenoid 304 will pull the link and drive arm to the left as shown in the drawing. As the movement continues, the bottom surface 310 of the ratchet pawl 262 will contact a ramp surface 312 of a bracket 314 as shown in FIG. 15 and will effectively rotate the ratchet pawl 262 in a counterclockwise direction so as to retract the extension 266 out of engagement from the ratchet wheel 66 toward the end of the stroke of the drive arm 292 and will thereby cause the latch to again engage the dog 268 and hold the ratchet pawl 262 in a latched position as shown in FIG. 13. A tension spring 316 has one end attached to the pin 308 and the other end attached to a suitable aperture in the bracket 314 and the spring 316 provides force tending to move the drive arm 292 back to its rest or ready position as shown in FIG. 13. When the latch is relatched, and the drive plate is moved back to its rest position, the latch extension 280 is again in position to be contacted by the plunger 282 of the solenoid 284 for subsequent operation.

The exploded perspective shown in FIG. 16 includes a modification to the supplemental drive mechanism shown in FIGS. 13-15, which modification is also shown in detail in FIGS. 17 and 18. It essentially involves a second ratchet pawl 262′ having a transverse extension 266′ and a latch dog 268′, with both of the ratchet pawls 262 and 262′ being adapted to engage the ratchet wheel 66 when the pawl latch 272 is released. As is best shown in FIG. 17, the ratchet pawl 262′ has a somewhat shorter length so that the extension 266′ is spaced from the extension 266 of the other ratchet pawl, with the spacing being approximately half the distance between adjacent teeth of the ratchet 66. This insures that upon release of the pawl latch, one of the extensions 266 or 266′ will immediately engage a tooth and drive the ratchet as is desired, rather than perhaps bounce away from the ratchet. It is appreciated that both of the ratchet pawls 262 and 262′ are biased toward the ratchet wheel 66.

In accordance with yet another important aspect of the present invention and as previously mentioned, the game device as embodied herein has an excessive energy absorption mechanism 72 shown in detail in FIGS. 19-24 for effectively limiting the maximum speed in which the reels may be rotated in response to an overzealous pull of the handle 48. Before describing the details of the energy absorption mechanism 72, the interconnection of the operating handle 48 with the main drive mechanism will be briefly described in conjunction with the exploded perspective view of FIG. 24, together with the plan view of FIG. 19. The handle 48 is connected to a shaft 320 which is connected via the energy absorbing mechanism 72 to a drive sprocket 322 that drives a smaller driven sprocket 324 via a chain 326. The driven sprocket 324 is fixedly attached to a shaft 328 which is in turn connected to a resistance imparting mechanism 330 which will be briefly hereinafter described, and the shaft 328 also carries a bracket 332 to which the leaf spring member 78 is attached for driving the main drive mechanism 60.

While the resistance mechanism 330 generally absorbs some of the energy, its primary purpose is to impose a feeling of resistance to a player pulling the handle to simulate the feel of prior art game devices which were essentially mechanical, and which were of the type wherein pulling of the handle stored energy into a spring mechanism that was released at the end of the handle stroke. The resistance mechanism is of the type which has a pair of circular discs 334 and 336, one of which is secured to the shaft 328, the other of which is fixed against rotating movement with a leather circular pad 338 being sandwiched between the discs 334 and 336. A compression spring 340 is positioned to bias the discs 334 and 336 together, with the leather pad 338 providing the resistance to relative rotating movement between the two discs. The spring 340 has one end bearing against the disc 334 and its opposite end bearing against a circular bracket 342 that is also preferably attached to the shaft 328.

Figure 21:
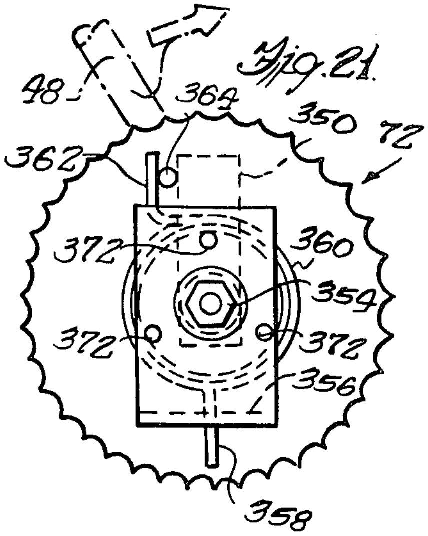
FIG. 21 is an end view of the mechanism shown in FIG. 20 and is taken generally from the left end thereof.
Figure 22:
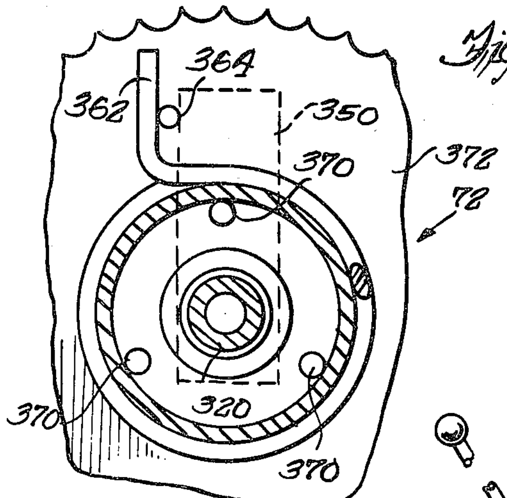
FIG. 22 is an enlarged cross sectional view of the excessive energy absorbing mechanism shown in FIGS. 19 and 20 and is taken generally along the line 22—22 of FIG. 20.

The excessive energy absorption apparatus 72 is best shown in FIGS. 20-23 and generally comprises an elongated lever arm 350 fixedly attached to the shaft 320 so that rotation of the shaft 320 also rotates the lever arm 350 and a second lever arm 352 is fixed to the left end portion of the shaft 320 by a bolt 354 or the like so that it is also fixedly attached thereto and rotates when the shaft 320 is rotated. The second lever arm 352 has a transverse extension 356 which engages an end 358 of a rather large coil spring 360 that is positioned around the shaft and the spring 360 has its opposite end 362 bearing upon a pin 364 that is attached to the drive sprocket 322. The pin 364 also extends beyond the opposite side of the sprocket 322 and engages the lever arm 350. It should be appreciated, however, that the pin 364 may comprise two angularly displaced pins or extensions from the sprocket rather than the single pin as shown since the principle of operation would be identical in such event. The spring 360 is preferably given one or more turns so that it normally biases its upper end 362 against the pin 364 and therefore against the lever arm 350. As is best shown in FIGS. 21 and 22, the opposite end 358 fitting in a slot 366 in the transverse extension 356. To maintain the spring 360 in a nice cylindrical shape, a shaping cylinder 368 fabricated of plastic or the like and having an outside diameter slightly smaller than the inside diameter of the coil spring 360 is provided and it is maintained in concentric relation with the shaft 320 by three positioning pins 370 located on the sprocket 322 and by similarly positioned pins 372 connected to the second lever arm 352.

During operation, it should be appreciated that by virtue of the fact that the drive sprocket 322 is freely rotatable about the shaft 320, it is rotated in response to pulling of the handle by the lever arm 352 and spring 360 contacting the pin 364. The lever arm 350 also bears against the pin 364 and prevents the spring 360 from unwinding, but as the handle is moved to the right as shown in view of FIG. 21, the entire mechanism shown therein will rotate in a clockwise direction around the shaft 320, provided the handle is not moved with extraordinary speed. However, in the event of an overzealous pull of the handle, the lever arm 350 will move relative to the spring end 362 and pin 364 and may separate from the pin 364 and excessive energy will be absorbed by the spring 360. In this manner, the drive sprocket 322 will sustain the entire force of the handle pull transmitted to it, which will thereby protect the main drive mechanism as is desired.

It is evident from the foregoing description of the main drive mechanism 60 and the supplemental drive mechanism 64 that neither of these mechanisms is operatively engaged with the shaft or discs 34 except momentarily during the active driving of them. Similarly, the indexing mechanism 70 is not engaged with the disc 34 after it has been reset upon completion of a play. Moreover, after the player has inserted a coin or otherwise enabled the play of the device, there is no contact with the shaft 40 or discs 34 by any of these three mechanisms until the handle 48 is pulled. Therefore, the reels are free to creep or turn under the influence of vibration of the game device, such as by shaking, pounding by the player or the like. Such creeping movement of the reels is undesirable for the reason that the player may attempt to rotate the reels so that a winning combination of symbols on the reels would be exposed and he may thereafter try to persuade the operators of a gaming establishment that he was won. For this reason, a mechanism is provided to prevent this creeping movement of the reels during this time period and the mechanism is shown in detail in FIGS. 25, 26 and 27.

After the reels and discs have been stopped by operation of the indexing mechanism and preferably after a coin has been inserted into the game device or has otherwise been enabled for a subsequent play, the mechanism, indicated generally at 380, is released for engagement with the outer periphery of the disc 34. The mechanism 380 is mounted to a channel bracket 382 by a mounting bracket 384 that carries an electrical coil 386 having electrical leads 388 connected to a suitable control circuit and the mounting bracket has a flange 390 to which a spring member 392 is attached. The spring member 392 is preferably made of a ferromagnetic material so that it can be attracted by operation of the coil 386 when moved within its influence and it is shown in its disengaged or ready position in FIG. 25. In this position, the spring member 392 is defected and is being held in response to the energization of the coil 386. Upon enablement of the game device, the coil 386 is deenergized which permits the resilient spring member 392 be released and it then assumes the position shown in FIG. 26 where it is in contact with the edge of the disc 34. A slight curved portion 394 is provided near the outer end thereof and an additional mass may also be provided at the end, in the form of a small square ferromagnetic plate 396. The curved portion 394 is adapted to provide an edge surface 398 which can be contacted by the edge of the disc 34 upon driving by the main drive mechanism so as to propel it outwardly thereof toward the coil 386 where it comes under the influence thereof and is thereafter held during spinning of the reel. As best shown in FIG. 27, the bracket 384 is connected to the channel bracket 382 so as to be coplanar with the disc and suitable spacers 400 and screws 402 connect the bracket 384 to the channel bracket 382 in conventional manner.

From the foregoing, it should be appreciated that an improved game device has been shown and described which has many desirable attributes, including permitting a player to have operating control in a game device of the type described which has not been possible in conventional prior art game devices. Moreover, many of the mechanisms disclosed herein, while being particularly suited in combination in the game device described herein, are useful when employed with conventional game devices of this type, i.e., those devices which may not have the reel speed directly controlled in proportion to the speed in which the operating handle is pulled. In this regard, the indexing mechanism 70 has desirable attributes that are conductive to use in conventional game devices and the supplemental drive mechanism may be useful as a drive mechanism for a conventional type of game device, rather than to merely increase the speed of rotating reels as is disclosed in the preferred embodiment herein.

It is, of course, understood that although preferred embodiments of the present invention have been illustrated and described herein, various modifications thereof will be apparent to those of ordinary skill in the art and, accordingly, the scope of the present invention should be defined only by the appended claims and equivalents thereof.

Various features of the invention are set forth in the following claims.

What is claimed is:

1. Apparatus for use in an amusement or game device of the type which has an operating handle that is pulled through a stroke upon initiation of operation by an operator, said apparatus absorbing excessive force that can be applied by an operator pulling the operating handle at a high speed through its stroke and comprising:

an operating shaft journaled for rotation in said game device and having said operating handle attached to one portion thereof;

a drive sprocket means carried by said shaft and being free to rotate relative thereto, said sprocket means having transverse extensions on opposite sides of said sprocket means;

first and second arm means, each being operably attached to said shaft to rotate with said shaft, said arm means being spaced from one another along said shaft;

a torsion spring means positioned around said shaft and located between said first and second arm means, said spring means having one end bearing on said first arm means and an opposite end bearing on one of said sprocket means extensions, the other of said sprocket means extensions bearing on one side of said second arm means;

the pulling of said handle tending to separate said other sprocket means extension from said second arm means, said spring means being biased in a direction to provide a force tending to maintain contact between said other sprocket means extension and said second arm means.

2. Apparatus as defined in claim 1 wherein said transverse extensions comprise a single pin means secured in an aperture in said sprocket means and extending outwardly on both sides thereof.

3. Apparatus as defined in claim 1 wherein said spring means comprises a multiple turn coil spring and a cylinder having an outside diameter slightly smaller than the inside diameter of said coil spring for maintaining said spring in its normally cylindrical shape.

4. Apparatus as defined in claim 1 further including a driven sprocket means mounted on a second shaft, both of said sprocket means being oriented in coplanar relation, and an endless chain means carried by both of said sprocket means so that said driven sprocket means is driven by said chain means and drive sprocket means.

5. Apparatus as defined in claim 4 further including resistance means connected to said second shaft for providing a resistance to rotation of said second shaft.

6. Apparatus for absorbing energy applied to a drive shaft during acceleration thereof in response to excessive rotational force being applied thereto in a first direction so that the full unabsorbed rotational force is not transmitted to a drive sprocket means operably associated therewith, comprising:

a drive shaft suitably journaled for rotation in response to rotational force being applied thereto;

a sprocket means carried by said drive shaft and being freely rotatable relative thereto, said sprocket means having first and second outward extensions on opposite sides of the sprocket means;

first and second arm means axially spaced from one another and connected to rotate with said drive shaft;

a coil spring means positioned around said drive shaft between said first arm means and said sprocket means, one end thereof bearing upon said first arm means and the opposite end bearing upon said first extension of said sprocket means, said spring means being loaded to provide a biasing force upon said sprocket means in said first direction;

said second extension of said sprocket means bearing against said second arm means, acceleration of said drive shaft in said first direction tending to separate said second extension of said second arm means.

7. Apparatus as defined in claim 6 wherein said transverse extensions comprise a single pin means secured in an aperture in said sprocket means and extending outwardly on both sides thereof.

8. Apparatus as defined in claim 6 wherein said spring means includes a cylinder having an outside diameter slightly smaller than the inside diameter of said coil spring for maintaining said spring in its normally cylindrical shape.

9. Apparatus as defined in claim 6 further including a driven sprocket means mounted on a second shaft, both of said sprocket means being oriented in coplanar relation, and an endless chain means carried by both of said sprocket means so that said driven sprocket means is driven by said chain means and drive sprocket means.

10. Apparatus as defined in claim 9 further including resistance means connected to said second shaft for providing a resistance to rotation of said second shaft.

* * * * *